United States Patent
Li et al.

(10) Patent No.: US 10,965,355 B2
(45) Date of Patent: Mar. 30, 2021

(54) PRECODING MATRIX INDEX REPORTING METHOD, COMMUNICATIONS APPARATUS, AND MEDIUM

(71) Applicant: HUAWEI TECHNOLOGIES CO., LTD., Shenzhen (CN)

(72) Inventors: Xueru Li, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/935,549

(22) Filed: Jul. 22, 2020

(65) Prior Publication Data
US 2020/0403667 A1 Dec. 24, 2020

Related U.S. Application Data

(63) Continuation of application No. PCT/CN2018/074496, filed on Jan. 29, 2018.

(51) Int. Cl.
*H04B 7/02* (2018.01)
*H04B 7/0456* (2017.01)
(Continued)

(52) U.S. Cl.
CPC ......... *H04B 7/0478* (2013.01); *H04B 7/0417* (2013.01); *H04B 7/0639* (2013.01); *H04B 7/0663* (2013.01)

(58) Field of Classification Search
CPC .. H04B 7/0478; H04B 7/0417; H04B 7/0639; H04B 7/0663
(Continued)

(56) References Cited

U.S. PATENT DOCUMENTS

| | | | |
|---|---|---|---|
| 8,750,358 B2 | 6/2014 | Yue et al. | |
| 2008/0186212 A1* | 8/2008 | Clerckx | H04B 7/10 341/55 |

(Continued)

FOREIGN PATENT DOCUMENTS

| | | |
|---|---|---|
| CN | 101273548 A | 9/2008 |
| CN | 101969366 A | 2/2011 |
| WO | 2014129843 A1 | 8/2014 |

OTHER PUBLICATIONS

3GPP TS 38.214 V15.0.0 (Dec. 2017),3rd Generation Partnership Project;Technical Specification Group Radio Access Network;NR;Physical layer procedures for data (Release 15), total 71 pages.
(Continued)

*Primary Examiner* — Helene E Tayong
(74) *Attorney, Agent, or Firm* — Rimon PC

(57) ABSTRACT

This application discloses a precoding matrix index (PMI) reporting method, and related communications apparatus and medium. The method includes: determining an rank indicator (RI) and a PMI, where the PMI is used to determine R precoding matrices $W_1, \ldots, W_R$. An $r^{th}$ precoding matrix $W_r$ in the R precoding matrices satisfies $W_r \times W_1 \times W_{2,r}$, where an $l^{th}$ row of $W_{2,r}$ is obtained by performing DFT transform on an $l^{th}$ row of a matrix $V_{2,r}$ and R is indicated by the RI. The PMI includes first indication information and second indication information. The first indication information includes location index information. The location index information is used to indicate $K_{m,r}$ element locations $t_{r,m,1}, \ldots, t_{r,m,K_{mj}} \in \{1, \ldots, T\}$ on an $m^{th}$ row of $V_{2,r}$. The second indication information is used to indicate $K_{m,r}$ complex coefficients $a_{r,m,t_{r,mj}}$ at the element locations $t_{r,m,1}, \ldots, t_{r,m,K_{mj}}$ on the $m^{th}$ row of $V_{2,r}$. $V_{2,r}$ is determined based on the $K_{m,r}$ element locations and the $K_{m,r}$ complex coefficients.

20 Claims, 10 Drawing Sheets

(51) Int. Cl.
*H04B 7/06* (2006.01)
*H04B 7/0417* (2017.01)

(58) Field of Classification Search
USPC .......................................................... 375/267
See application file for complete search history.

(56) References Cited

U.S. PATENT DOCUMENTS

2013/0064317 A1* 3/2013 Tong .................... H04B 7/0469
375/267
2016/0087701 A1* 3/2016 Wu ....................... H04B 7/0456
375/267
2017/0338879 A1* 11/2017 Hessler ................. H04B 7/0456

OTHER PUBLICATIONS

Samsung, "4Tx and 8Tx feedback framework for Rel. 10.," 3GPP TSG RAN WG1 Meeting #62, Madrid, Spain, Aug. 23, 2010, R1-104602, 13 pages.

* cited by examiner

PRECODING MATRIX INDEX REPORTING METHOD, COMMUNICATIONS APPARATUS, AND MEDIUM

CROSS-REFERENCE TO RELATED APPLICATIONS

This application is a continuation of International Application No. PCT/CN2018/074496, filed on Jan. 29, 2018, the disclosure of which is hereby incorporated by reference in its entirety.

TECHNICAL FIELD

This application relates to the field of wireless communications technologies, and in particular, to a precoding matrix index reporting method, a communications apparatus, and a medium.

BACKGROUND

A multi-input multi-output (MIMO) technology is widely used in a long term evolution (LTE) system. For a user near the cell edge, a space frequency block code (SFBC) transmission mode is used to improve the signal-to-noise ratio (SNR) on a cell edge. For a use near the cell center, a multi-layer parallel transmission mode is used to provide a relatively high data transmission rate. When a base station can obtain all or some downlink channel information, a precoding technology may be used to improve signal transmission quality or increase a signal transmission rate. For a TDD (Time Division Duplexing) system, due to reciprocity of uplink and downlink of a radio channel, a downlink precoding weighted vector can be estimated based on an uplink channel. However, for an FDD (Frequency Division Duplexing) system, because an uplink carrier frequency is different from a downlink carrier frequency, the downlink precoding weighted vector cannot be obtained by using the uplink channel. In an LTE system, a precoding weighted matrix is usually obtained by feedback of a rank indicator (RI) and a precoding matrix indicator (PMI) sent by a terminal user.

To achieve a trade-off between improving feedback precision of the PMI and reducing feedback overheads of the PMI, in the LTE system and a next-generation wireless communications system, the PMI is divided into a PMI 1 and a PMI 2. The PMI 1 indicates a first precoding matrix W1, and is a wideband parameter. The PMI 2 indicates a second precoding matrix W2, and is a subband parameter. In this feedback mechanism, a precoding matrix (W) is obtained by combining W1 and W2, that is:

$$W = W_1 \times W_2 \quad \text{(Formula 1)},$$

where

W1 is a diagonal block matrix, and each diagonal block matrix includes L basis vectors (for example, two-dimensional discrete Fourier transform (Discrete Fourier Transform, DFT) vectors), that is:

$$W_1 = \begin{bmatrix} b_0^m, b_1^m & \cdots & b_{L-1}^m & 0 \\ 0 & & b_0^m, b_1^m & \cdots & b_{L-1}^m \end{bmatrix}, \quad \text{(Formula 2)}$$

where $b_0^m, b_1^m \ldots b_{L-1}^m$ is the foregoing L basis vectors, and $b_i^m$ (i=0, 1 ... L−1) may ternatively be understood as a beam vector. The L beam vectors $b_i^m$ (i=0, 1 ... L−1) may be orthogonal to each other.

A W2 matrix on a subband is a 2L ×R matrix, and R is indicated by an RI, for example, R=RI+1. When R is 1 and R is 2, specific structures of W2 are respectively as follows:

$$W_2 = \begin{bmatrix} p_{0,0,0} \cdot c_{0,0,0} \\ p_{0,0,1} \cdot c_{0,0,1} \\ \cdots \\ p_{0,0,L-1} \cdot c_{0,0,L-1} \\ p_{1,0,0} \cdot c_{1,0,0} \\ p_{1,0,1} \cdot c_{1,0,1} \\ \cdots \\ p_{1,0,L-1} \cdot c_{1,0,L-1} \end{bmatrix} \quad \text{(Formula 3)}$$

and $$W_2 = \begin{bmatrix} p_{0,0,0} \cdot c_{0,0,0} & p_{0,1,0} \cdot c_{0,1,0} \\ p_{0,0,1} \cdot c_{0,0,1} & p_{0,1,1} \cdot c_{0,1,1} \\ \cdots & \cdots \\ p_{0,0,L-1} \cdot c_{0,0,L-1} & p_{0,1,L-1} \cdot c_{0,1,L-1} \\ p_{1,0,0} \cdot c_{1,0,0} & p_{1,1,0} \cdot c_{1,1,0} \\ p_{1,0,1} \cdot c_{1,0,1} & p_{1,1,0} \cdot c_{1,1,0} \\ \cdots & \cdots \\ p_{1,0,L-1} \cdot c_{1,0,L-1} & p_{1,1,L-1} \cdot c_{1,1,L-1} \end{bmatrix}, \quad \text{(Formula 4)}$$

where $p_{r,l,i}$ represents amplitude information of a coefficient, and $c_{p,l,i}$ represents phase information of the coefficient. Herein, the wideband is entire feedback bandwidth of channel state information (Channel State Indication, CSI), and the subband is a subband in the wideband.

$r \in \{0,1\}$ represents an index in terms of a dimension of a polarization direction of an antenna, $l \in \{1, \ldots, RI\}$ brepresents a sequence number of a layer, and $i \in \{1, \ldots L-1\}$ corresponds to the basis vector $b_i^m$.

Generally, the amplitude information and the phase information of the coefficient are quantized based on a predefined quantization set. For example, a quantization set of phases may be $$c_{p,l,i} \in \{e^{j\frac{\pi n}{2}}, n = 0, 1, 2, 3\},$$

or $$c_{p,l,i} \in \{e^{j\frac{\pi n}{4}}, n = 0, 1, 2, 3, \ldots, 7\}.$$

The amplitude information may be further split into a wideband amplitude $P_{r,l,i}^{(WB)}$ and a subband amplitude $p_{r,l,i}^{(SB)}$, and $p_{r,l,i} = p_{r,l,i}^{(WB)} p_{r,l,i}^{(SB)}$. The wideband amplitude feeds back one value in the entire bandwidth, and the subband amplitude feeds back different values for different subbands. The quantization sets of the wideband amplitude and the subband amplitude may be $p_{r,l,i}^{(WB)} \in \{1, \sqrt{0.5} \sqrt{0.25} \sqrt{0.125} \sqrt{0.0625} \sqrt{0.0313} \sqrt{0.0156}\ 0\}$ and $p_{r,l,i}^{(SB)} \in \{1\sqrt{0.5}\}$ respectively.

In the prior art, UE notifies, by reporting the PMI 1 and the PMI 2, a base station of a precoding matrix selected by the UE. The PMI 1 is used to indicate W1, and the PMI 2 is used to indicate W2. To reduce feedback overheads, it is usually assumed that W1 is the same in the entire CSI feedback bandwidth and for all RI layers, that is, W1 is a common parameter. However, the values of W2 of different subbands and different layers of each subband in the entire bandwidth may be different. Therefore, the PMI 1 is known as a wideband feedback parameter, and the PMI 2 is known as a subband feedback parameter. Because W2 relates to feedbacks of amplitudes and phases of 2L coefficients, a feedback of the PMI 2 on each subband requires a relatively large quantity of bits. Further, when a quantity of subbands is relatively large or the value of R is relatively large, the total feedback overhead of the PMI 2 increases rapidly. Therefore, how to reduce feedback overhead of PMI 2 indices is a technical problem that currently needs to be resolved.

SUMMARY

Embodiments of the present invention provide a precoding matrix index reporting method, a communications apparatus, and a medium, to reduce resource overheads occupied when a terminal reports a precoding matrix index.

The embodiments of the present invention may be specifically implemented by using the following technical solutions.

According to a first aspect, an embodiment of the present invention provides a precoding matrix index reporting method, applied to a first communications apparatus side. The method includes: The first communications apparatus determines a rank indicator RI and a precoding matrix indicator PMI, where the PMI is used to determine R precoding matrices $W_1, \ldots,$ and $W_R$, and an $r^{th}$ precoding matrix $W_r$ in the R precoding matrices satisfies $W_r = W_1 \times W_{2,r}$, and $r \in \{1, \ldots, R\}$. $W_1$ is a matrix of N rows and 2L columns, $W_{2,r}$ is a matrix of 2L rows and F columns, an $l^{th}$ row of $W_{2,r}$ is obtained by performing DFT transform on an $l^{th}$ row of a matrix $V_{2,r}$, $V_{2,r}$ is a matrix of 2L rows and T columns, R is indicated by the RI, and $l \in \{1 \ldots, 2L\}$. The PMI includes first indication information and second indication information, the first indication information includes location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, where $V_{2,r}$ is determined by the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$. R is a non-negative integer, N, L, F, T, and $K_{m,r}$ are all positive integers, $K_{m,r}$ is less than T, and F is less than or equal to T. The first communications apparatus sends the RI and the PMI.

According to a second aspect, an embodiment of the present invention provides a precoding matrix index reporting method, applied to a second communications apparatus side. The method includes: The second communications apparatus receives a rank indicator RI and a precoding matrix indicator PMI. The second communications apparatus determines R precoding matrices $W_1, \ldots, W_R$ based on the PMI, where an $r^{th}$ precoding matrix $W_r$ in the R precoding matrices satisfies $W_r = W_1 \times W_{2,r}$, and $r \in \{1, \ldots, R\}$. $W_1$ is a matrix of N rows and 2L columns, $W_{2,r}$ is a matrix of 2L rows and F columns, an $l^{th}$ row of $W_{2,r}$ is obtained by performing DFT transform on an $l^{th}$ row of a matrix $V_{2,r}$, $V_{2,r}$ is a matrix of 2L rows and T columns, R is indicated by the RI, and $l \in \{1, \ldots, 2L\}$. The PMI includes first indication information and second indication information, the first indication information includes location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, where $V_{2,r}$ is determined by the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$. The RI is a non-negative integer, N, L, F, T, R, and $K_{m,r}$ are all positive integers, $K_{m,r}$ is less than T, and F is less than or equal to T.

During implementation of the method described in the first aspect or the second aspect, when the precoding matrix index is reported, only some element locations and coefficients at some element locations may be reported. Therefore, resource overheads occupied for reporting the precoding matrix index can be reduced.

Optionally, in this embodiment of the present invention, an element x belongs to a set X, and $x \in X$ represents that the element x may be any value in the set X, but does not need to traverse each value in X. For example, the foregoing $m \in \{1, \ldots, 2L\}$ may indicate that when m is any element in $\{1, \ldots, 2L\}$, and when the method described in the first aspect or the second aspect is implemented, that "the PMI includes first indication information and second indication information, the first indication information includes location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{the}$ row of $V_{2,r}$, where $V_{2,r}$ is determined by the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$." is true. Alternatively, it may indicate that, when m is any one of some elements in $\{1, \ldots, 2L\}$, during implementation of method described in the first aspect or the second aspect, that "the PMI includes first indication information and second indication information, the first indication information includes location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, where $V_{2,r}$ is determined by the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$." is true, and if m is a value other than some elements, the foregoing method is not true.

In a specific example, that "the PMI includes first indication information and second indication information, the first indication information includes location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, where $V_{2,r}$ is determined by the $K_{m,r}$ element locations and the $K_{m,r}$ complex coefficients and $a_{r,m,t_{r,m,i}}$, $m \in \{1, \ldots, 2L\}$ and $i \in \{1, \ldots, K_{m,r}\}$" indicates that: The first indication information includes the location index information, the location index information indicates $K_{m,r}$ element locations $t_{r,m,1}, \ldots, t_{r,m,K_{m,r}} \in \{1, \ldots, T\}$ (m represents a row number) on each of 2L−1 rows other than an $m_{0\ th}$ row from a first row to a $(2L)^{th}$ row of $V_{2,r}$, and the second indication information is used to indicate $K_{m,r}$ complex coefficients $a_{r,m,t_{r,m,i}}$ (m represents a row number) at the element locations $t_{r,m,1}, \ldots, t_{r,m,K_{m,r}}$ on each of the 2L−1 rows other than the $m_{0\,th}$ row from the first row to the $(2L)^{th}$ row of $V_{2,r}$. In this case, $K_{m0,r}$ element locations and corresponding complex coefficients on the $m_{0\,th}$ row may be determined by using a predefined method, and therefore do not need to be indicated by using the PMI. In this case, that "$V_{2,r}$ is determined by the $K_{m,r}$ element locations and the $K_{m,r}$ complex coefficients $a_{r,m,t_{r,m,i}}$" is specifically that: $V_{2,r}$ is determined by $K_{m,r}$ element locations on rows other than the $m_{0\,th}$ row, the $K_{m,r}$ complex coefficients $a_{r,m,t_{r,m,i}}$, and predefined element locations and coefficient values on the $m_{0\,th}$ row.

Optionally, for the $m^{th}$ row of $V_{2,r}$, complex coefficients at element locations other than the $K_{m,r}$ element locations may be a predefined value, for example, 0. In this case, that "$V_{2,r}$ is determined by the $K_{m,r}$ element locations and the $K_{m,r}$ complex coefficients $a_{r,m,t_{r,m,i}}$" is specifically that: $V_{2,r}$ is determined by the $K_{m,r}$ element locations, the $K_{m,r}$ complex coefficients $a_{r,m,t_{r,m,i}}$, and the coefficient 0 at the element locations other than the $K_{m,r}$ element locations.

Optionally, a rule that R is indicated by the RI may be determined according to a predefined rule. For example, when a value of the RI is a binary number starting from 00, R=f(RI)+1, as shown in Table 1. Alternatively, when a value of the RI is a binary number starting from 01, R=f(RI), as shown in Table 2. The function f(x) represents conversion from the binary sequence x to decimal integers.

TABLE 1

| RI | R |
|---|---|
| 00 | 1 |
| 01 | 2 |
| 10 | 3 |
| ... | ... |

TABLE 2

| RI | R |
|---|---|
| 01 | 1 |
| 10 | 2 |
| ... | ... |

For another example, when a value of the RI is an integer starting from 0, R=RI+1, as shown in Table 3. Alternatively, when a value of the RI is an integer starting from 1, R=RI, as shown in Table 4.

TABLE 3

| RI | R |
|---|---|
| 0 | 1 |
| 1 | 2 |
| 2 | 3 |
| ... | ... |

TABLE 4

| RI | R |
|---|---|
| 1 | 1 |
| 2 | 2 |
| ... | ... |

Optionally, there may be a plurality of methods for determining the precoding matrix based on the PMI during implementation in which "the PMI is used to determine R precoding matrices $W_1, \ldots, W_R$" according to the first aspect and during implementation in which "the second communications apparatus determines R precoding matrices $W_1, \ldots, W_R$ based on the PMI" according to the second aspect. For example, the first communications apparatus and the second communications apparatus may store precoding matrices $W_1, \ldots, W_R$ with different PMI values, and then determine, based on the reported PMI, the precoding matrices $W_1, \ldots, W_R$ selected by the first communications apparatus. Alternatively, a table is predefined in a standard, and the first communications apparatus and the second communications apparatus may obtain the precoding matrices $W_1, \ldots, W_R$ through calculation based on values of parameters included in the PMI by using the table. In this case, the first communications apparatus and the second communications apparatus may calculate, based on the reported PMI, the precoding matrices selected by the first communications apparatus.

With reference to the first aspect or the second aspect, in a possible design, RI≥2, and for an $m^{th}$ row, the location index information indicates a group of locations $C_{m,1}, \ldots, C_{m,K_m}$, where the group of locations $C_{m,1}, \ldots, C_{m,K_m}$ is used to indicate $K_{m,r}$ element locations on an $m^{th}$ row of each of R matrices $V_{2,1}, \ldots, V_{2,R}$, that is $t_{r,m,i}=c_{m,i}$ and $K_{m,r}=K_m$, where $m\in\{1, \ldots, 2L\}$ and $i\in\{1, \ldots, K_{m,r}\}$. During implementation of this embodiment of the present invention, when the element locations on the $m^{th}$ row of the $V_{2,r}$ matrix are reported, for the $m^{th}$ row of all the R $V_{2,r}$ matrices, only one group of locations may be reported, that is, values of the reported $K_{m,r}$ element locations for different values of r are the same. As compared with a manner in which a group of locations on the $m^{th}$ row of each $V_{2,r}$ matrix is separately reported, feedback overheads of the PMI are reduced in this embodiment of the present invention.

It should be noted that, an implementation in which "the location index information indicates a group of locations $C_{m,1}, \ldots, C_{m,K_m}$" is that: The location index information includes $K_m$ element locations $C_{m,1}, \ldots, C_{m,K_m}$, and a second implementation is that: The location index information includes $M_m$ reference locations and window sizes respectively corresponding to $M_m$ reference locations, and the $K_m$ element locations $C_{m,1}, \ldots, C_{m,K_m}$ may be determined based on the $M_m$ reference locations and the window sizes respectively corresponding to the $M_m$ reference locations.

That "the group of locations $C_{m,1}, \ldots, C_{m,K_m}$ is used to indicate $K_{m,r}$ element locations on an $m^{th}$ row of each of R matrices $V_{2,1}, \ldots, V_2$" is that: The $K_{m,r}$ element locations $t_{r,m,1}, \ldots, t_{r,m,K_{m,r}}$ may be determined based on the group of locations $C_{m,1}, \ldots, C_{m,K_m}$, that is, $t_{r,m,i}=c_{m,i}$.

It should be noted that parameters of the PMI that are actually reported are parameters determined based on the group of locations $C_{m,1}, \ldots, C_{m,K_m}$, but are not based on the $K_{m,r}$ element locations $t_{r,m,1}, \ldots, t_{r,m,K_{m,r}}$.

With reference to the first aspect or the second aspect, in a possible design, the location index information includes indication information of $M_m$ reference locations, the indication information of the $M_m$ reference locations is used to indicate the group of locations $C_{m,1}, \ldots, C_{m,K_m}$, and $M_m$ is a positive integer less than T.

It should be noted that, that "the indication information of the $M_m$ reference locations is used to indicate the group of locations $C_{m,1}, \ldots, C_{m,K_m}$" is that: The group of locations $C_{m,1}, \ldots, C_{m,K_m}$ may be determined based on the $M_m$ reference locations.

With reference to the first aspect or the second aspect, in a possible design, for the $m^{th}$ row, the location index information further includes a window size $X_{m,n}$ associated with an $n^{th}$ (n=1, ..., $M_m$) reference location in the $M_m$ reference locations, the $M_m$ reference locations and the $M_m$ window sizes are used to determine the group of locations $C_{m,1}, \ldots, C_{m,K_m}$, and $X_{m,n}$ is a positive integer; or a window size $X_{m,n}$ associated with an $n^{th}$ (n=1, ..., $M_m$) reference location in the $M_m$ reference locations is configured by using first configuration information, the $M_m$ reference locations and the $M_m$ window sizes are used to determine the group of locations $C_{m,1}, \ldots, C_{m,K_m}$, and $X_{m,n}$ is a positive integer.

There are a plurality of methods for determining the $K_m$ locations $C_{m,1}, \ldots, C_{m,K_m}$ based on the $M_m$ window sizes $X_{m,n}$ and the $M_m$ reference locations. $M_m=1$ is used as an example. Optionally, $X_{m,n}$ locations starting from a reference location (including the reference location) are counted along a direction in which a column number of the matrix $V_{2,r}$ increases, where the $X_{m,n}$ locations are included in the $K_m$ locations $C_{m,1}, \ldots, C_{m,K_m}$. In this case, $1+X_{m,n}=K_m$. Optionally, $X_{m,n}-1$ locations starting from a reference location (including the reference location) are counted along a direction in which a column number of the matrix $V_{2,r}$ increases, where the $X_{m,n}$ locations are the $K_m$ locations $C_{m,1}, \ldots, C_{m,K_m}$. In this case, $X_{m,n}=K_m$. Similar to the foregoing two methods, $X_{m,n}$ locations starting from a reference location may alternatively be counted along a direction in which a column number of the matrix $V_{2,r}$ decreases. Details are not described again. Optionally, a reference location is used as a central location, $X_{m,n}$ locations are counted respectively along a direction in which a column number of the matrix $V_{2,r}$ decreases and along a direction in which a column number of the matrix $V_{2,r}$ increases, and the $2X_{m,n}+1$ locations are the $K_m$ locations $C_{m,1}, \ldots, C_{m,K_m}$. Optionally, a reference location is used as a central location, $X_{m,n}/2$ locations are counted respectively along a direction in which a column number of the matrix $V_{2,r}$ decreases and along a direction in which a column number of the matrix $V_{2,r}$ increases, and the $X_{m,n}+1$ locations are the $K_m$ locations $C_{m,1}, \ldots, C_{m,K_m}$. There may be another determining manner. This is not excluded herein.

With reference to the first aspect or the second aspect, in a possible design, when a quantity $M_m$ of the reference locations is greater than 1, the location index information includes absolute location information of one first reference location in the $M_m$ reference locations, and relative location information that is of each of $M_m-1$ reference locations, other than the first reference location, in the $M_m$ reference locations and that is relative to the first reference location, where one piece of absolute location information and other $M_m-1$ pieces of relative location information are used to indicate the group of locations $C_{m,1}, \ldots, C_{m,K_m}$. Optionally, the absolute location information is location information relative to a value 0 in column numbers ranging from 1 to T of the matrix $V_{2,r}$. For example, if absolute location information of a first reference location on the $m^{th}$ row is $T_0$ (a value range is 0 to T-1), the first reference location is located on the $m^{th}$ row and the $(\mod(T_0, T)+1)^{th}$ column of the matrix. For another example, if absolute location information of a first reference location on the $m^{th}$ row is $T_0$ (a value range is 1 to T), the first reference location is located on the $m^{th}$ row and the $(\mod(T0-1, T)+1)^{th}$ column of the matrix. Optionally, the relative location information indicates a relative location relative to the absolute location information $T_0$. $M_m=2$ is used as an example. Assuming that the relative location information is $\Delta T$ ($\Delta T$ is an integer), an element location indicated by the relative location information is on the $m^t$ row and the $(\mod(\Delta T+T_0)+1)^{th}$ column (if a value of $T_0$ starts from 0) of $V_{2,r}$, or is on the $m^{th}$ row and the $(\mod(\Delta T+T_0-1)+1)^{th}$ column (if a value of $T_0$ starts from 1) of $V_{2,r}$. During implementation of this embodiment of the present invention, due to a time domain characteristic of a channel, that is, delays of a plurality of sub-paths of the channel in time domain are usually relatively centralized, a value interval of relative location information of the $M_m-1$ elements is far less than a value interval of absolute location information. Therefore, a quantity of quantization bits of quantized location information can be reduced in a manner of reporting the relative location information, thereby reducing feedback overheads of the PMI. For example, if there are a total of 64 sampling points in time domain in terms of multipath delays of a channel, it indicates that one piece of absolute location information of the element needs to be represented by using 6 bits. When values of the multipath delays of the channel are relatively centralized, for example, the multipath delays of the channel are all within 16 sampling points after the first absolute location, each piece of relative location information of the element needs to be represented by using 4 bits. Therefore, feedback overheads of the PMI can be reduced by reporting the relative location information.

With reference to the first aspect or the second aspect, in a possible design, the location index information further includes $G_m$ groups of fourth indication information, and an $n^{th}$ ($1 \le n \le G_m$) group of fourth indication information is used to indicate $Z_{m,n}$ element locations selected from $Y_{m,n}$ element locations, where the $Y_{m,n}$ element locations are determined based on the $n^{th}$ reference location in the $G_m$ reference locations and a window size $X_{m,n}$ associated with the $n^{th}$ reference location, $Z_{m,n}$ is a positive integer less than or equal to $Y_{m,n}$, and the $G_m$ reference locations, the $G_m$ window sizes, and the $G_m$ pieces of fourth indication information are used to determine the group of locations $C_{m,1}, \ldots, C_{m,K_m}$.

With reference to the first aspect or the second aspect, in a possible design, $R \ge 1$, and the location index information indicates R groups of locations, where an $r^{th}$ group of locations $C_{r,1}, \ldots, C_{r,K_r}$ in the R groups of locations is used to indicate the $K_{m,r}$ element locations on at least two rows in $V_{2,r}$, that is, $n \in \{1, \ldots, 2L\}$, $m \in \{1, \ldots, 2L\}$, $i \in \{1, \ldots, K_r\}$, and $n \ne m$, and it satisfies that $t_{r,m,i} = t_{r,n,i} = c_{r,i}$, $K_{m,r} = K_{n,r} = K_r$, $i \in \{1, \ldots K_r\}$, and $r \in \{1, \ldots, R\}$. Optionally, the two rows may be different two rows in the R matrices. For example, in the matrix $V_{2,1}$, a reported group of locations indicates element locations on an $(n1)^{th}$ row and an $(m1)^{th}$ row; and in the matrix $V_{2,2}$, a reported group of locations indicates element locations on an $(n2)^{th}$ row and an $(m2)^{th}$ row. Optionally, the two rows may be the same two rows in the R matrices. During implementation of this embodiment of the present invention, for at least two rows in each of the R matrices $V_{2,1}, \ldots, V_{2,R}$, only one group of locations may be reported. As compared with a manner in which a group of locations on each row of the matrix $V_{2,r}$ is separately reported, feedback overheads of the PMI are reduced. Further, optionally, for 2L-1 rows of an $r^{th}$ $V_{2,r}$ matrix, only one group of locations is reported, that is, $t_{r,m,i} = C_{r,k_i}$, and $K_{m,r} = K_r$, so that feedback overheads of the PMI can be further reduced. Similarly, the 2L-1 rows may be different 2L-1 rows in the R matrices, or may be the same 2L-1 rows.

It should be noted that, an implementation in which "the location index information indicates R groups of locations"

is that: The location index information includes the R groups of locations, and a second implementation is that: The location index information includes $M_r$ reference locations and window sizes respectively corresponding to the $M_r$ reference locations, and the $r^{th}$ group of locations $C_{r,1}, \ldots, C_{r,K_r}$ in the R groups of locations may be determined based on the $M_r$ reference locations and the window sizes respectively corresponding to the $M_r$ reference locations.

That "an $r^{th}$ group of locations $C_{r,1}, \ldots, C_{r,K_r}$ in the R groups of locations is used to indicate the $K_{m,r}$ element locations on at least two rows in $V_{2,r}$," is that: The $K_{m,r}$ element locations on at least two rows in $V_{2,r}$ may be determined based on the $r^{th}$ group of locations $C_{r,1}, \ldots, C_{r,K_r}$ in the R groups of locations.

Parameters of the PMI that are actually reported are parameters determined based on the $r^{th}$ group of locations $C_{r,1}, \ldots, C_{r,K_r}$ in the R groups of locations, but are not based on the $K_{m,r}$ element locations $t_{r,m,1}, \ldots, t_{r,m,K_{m,r}}$.

With reference to the first aspect or the second aspect, in a possible design, the location index information includes indication information of $M_r$ reference locations, the indication information of the $M_r$ reference locations is used to indicate the $r^{th}$ group of locations $C_{m,1}, \ldots, C_{m,K_r}$ in the R groups of locations, and $M_r$ is a positive integer less than T.

With reference to the first aspect or the second aspect, in a possible design, the location index information further includes a window size $X_{r,n}$ associated with an $n^{th}$ ($n=1, \ldots, M_r$) reference location in the $M_r$ reference locations, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer; or a window size $X_{r,n}$ associated with an $n^{th}$ ($n=1, \ldots, M_r$) reference location in the $M_r$ reference locations is configured by using first configuration information, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer.

There are a plurality of methods for determining the $K_r$ locations $C_{r,1}, \ldots, C_{r,K_r}$ based on the $M_r$ window sizes $X_{r,n}$ and the $M_r$ reference locations. $M_r=1$ is used as an example. Optionally, $X_{r,n}$ locations starting from a reference location (including the reference location) are counted along a direction in which a column number of the matrix $V_{2,r}$ increases, where the $X_{r,n}$ locations are included in the $K_r$ locations $C_{r,1}, \ldots, C_{r,K_r}$. In this case, $1+X_{r,n}=K_r$. Optionally, $X_{r,n}-1$ locations starting from a reference location (including the reference location) are counted along a direction in which a column number of the matrix $V_{2,r}$ increases, where the $X_{r,n}$ locations are the $K_r$ locations $C_{r,1}, \ldots, C_{r,K_r}$. In this case, $X_{r,n}=K_r$. Similar to the foregoing two methods, $X_{r,n}$ locations starting from a reference location may alternatively be counted along a direction in which a column number of the matrix $V_{2,r}$ decreases. Details are not described again. Optionally, a reference location is used as a central location, $X_{r,n}$ locations are counted respectively along a direction in which a column number of the matrix $V_{2,r}$ decreases and along a direction in which a column number of the matrix $V_{2,r}$ increases, and the $2X_{r,n}+1$ locations are the $K_r$ locations. Optionally, a reference location is used as a central location, $X_{r,n}/2$ locations are counted respectively along a direction in which a column number of the matrix $V_{2,r}$ decreases and along a direction in which a column number of the matrix $V_{2,r}$ increases, and the $X_{r,n}+1$ locations are the $K_r$ locations. There may be another determining manner. This is not excluded herein.

With reference to the first aspect or the second aspect, in a possible design, for each of the R matrices $V_{2,1}, \ldots, V_{2,r}$ and at least two rows in each matrix, only one group of locations is reported. As compared with a manner in which one group of locations on each row in the R $V_{2,r}$ matrices is separately reported, feedback overheads of the PMI are reduced. Further, optionally, in a possible design, for each of the R matrices $V_{2,1}, \ldots, V_{2,r}$ and $2L-1$ rows of each matrix, only one group of locations is reported. In this case, for an $r^{th}$ matrix $V_{2,r}$, an element location on an $i_r$th row does not need to be reported by using the index information, but uses a predefined value. A row number index of the $i_r$th row of the $r^{th}$ matrix may be reported by the first communications apparatus to the second communications apparatus.

With reference to the first aspect or the second aspect, in a possible design, when a quantity $M_r$ of the reference locations is greater than 1, the location index information includes absolute location information of one first reference location in the $M_r$ reference locations, and relative location information that is of each of $M_r-1$ reference locations, other than the first reference location, in the $M_r$ reference locations and that is relative to the first reference location. During implementation of this embodiment of the present invention, due to a time domain characteristic of a channel, that is, delays of a plurality of sub-paths of the channel in time domain are usually relatively centralized, a value interval of relative location information of the $M_r-1$ elements is far less than a value interval of absolute location information. Therefore, a quantity of quantization bits of quantized location information can be reduced in a manner of reporting the relative location information, thereby reducing feedback overheads of the PMI. For example, if there are a total of 64 sampling points in time domain in terms of multipath delays of a channel, it indicates that one piece of absolute location information of the element needs to be represented by using 6 bits. When values of the multipath delays of the channel are relatively centralized, for example, the multipath delays of the channel are all within 16 sampling points after the first absolute location, each piece of relative location information of the element needs to be represented by using 4 bits. Therefore, feedback overheads of the PMI can be reduced by reporting the relative location information. For the absolute location information and the relative location information, refer to the foregoing explanations. Details are not described again.

With reference to the first aspect or the second aspect, in a possible design, the location index information further includes $G_r$ groups of fourth indication information, and an $n^{th}$ ($1 \leq n \leq G_r$) group of fourth indication information is used to indicate $Z_{r,n}$ element locations selected from $Y_{r,n}$ element locations, where the $Y_{r,n}$ element locations are determined based on an $n^{th}$ reference location in the $G_r$ reference locations and a window size $X_{r,n}$ associated with the $n^{th}$ reference location, $Z_{r,n}$ is a positive integer less than or equal to $Y_{r,n}$, and the $G_r$ reference locations, the $G_r$ window sizes, and the $G_r$ pieces of fourth indication information are used to determine the $r^{th}$ group of locations $C_{m,1}, \ldots, C_{m,K_r}$ in the R groups of locations.

With reference to the first aspect or the second aspect, in a possible design, the first indication information further includes indication information of $|A|$ first element locations $\tau_{r,m}$ and one second element location $\gamma_r$ of $V_{2,r}$, $m \in A$, the set A is a non-empty subset of a set $\{1, \ldots, 2L\}$, $|A|$ represents a quantity of elements in the set A, and $r \in \{1, \ldots, R\}$. $\tau_{r,m}$ is an element location with a maximum coefficient amplitude $|a_{r,m,t_{r,m_j}}|$ in the $K_{m,r}$ element locations $t_{r,m,1}, \ldots, t_{r,m,K_{m,r}}$, and the second element location $\gamma_r$ is an element location with a maximum coefficient amplitude $|a_{r,m,\tau_{r,g}}|$ in the $|A|$ first element locations $\tau_{r,m}$. The second indication information includes relative values of all or some of coefficients $a_{r,m,t_{r,m,j}}$ at $K_{m,r}-1$ element locations, other than the first element location, in the $K_{m,r}$ element locations and a coefficient $a_{r,m,\tau_{r,m}}$ at the first element location $\tau_{r,m}$; and the second indication information further includes relative values of all or some coefficients $a_{r,m,\tau_{r,m}}$ at $|A|-1$ first element locations, other than the second element location $\gamma_r$, in the $|A|$ first element locations $\tau_{r,m}$ and a coefficient $a_{r,m,\gamma_r}$ at the second element location $\gamma_r$. During implementation of this embodiment of the present invention, the coefficients are reported in a normalized manner, so that feedback overheads of the PMI can be reduced. In addition, in this embodiment of the present invention, coefficient normalization of each row is performed only based on a maximum value of a coefficient amplitude of the row, so that a case can be avoided in which coefficients of many rows are normalized and quantized to 0 values because a maximum value of a coefficient amplitude of some rows is far greater than a maximum value of a coefficient amplitude of another row, and in this way, feedback overheads of the PMI are reduced, and feedback precision of the PMI is ensured.

With reference to the first aspect or the second aspect, in a possible design, the first indication information includes a third element location $\gamma_r$ of $V_{2,r}$, and $\gamma_r$ is used to indicate an element location with a maximum coefficient amplitude $|a_{r,m,t_{r,m,j}}|$ at element locations $$\bigcup_{m \in A} \{t_{r,m,1}, \ldots, t_{r,m,K_{m,r}}\}.$$

The second indication information includes relative values of all or some coefficients at element locations, other than the third element location $\gamma_r$, in the element locations $$\bigcup_{m \in A} \{t_{r,m,1}, \ldots, t_{r,m,K_{m,r}}\}$$

and a coefficient at the location $\gamma_r$, where $$\bigcup_{m \in A} \{t_{r,m,1}, \ldots, t_{r,m,K_{m,r}}\}$$

is a set obtained by obtaining a union set of sets $\{t_{r,m,l}, \ldots, t_{r,m,K_m}\}$ corresponding to all elements m belonging to the set A. During implementation of this embodiment of the present invention, the coefficients are reported in a normalized manner, so that feedback overheads of the PMI can be reduced.

Optionally, the set A is a non-empty proper subset of the set $\{1, \ldots, 2L\}$. In this case, the first indication information includes indication information of a first element location $\tau_{r,m}$ and one second element location $\gamma_r$ that are on some rows of $V_{2,r}$, but does not include a first element location $\tau_{r,m}$ on at least one row. The second indication information includes coefficient information of some rows of $V_{2,r}$, but does not include coefficient information of at least one row. A predefined value may be used respectively for the first element location $\tau_{r,m}$ on the at least one row that is not included in the first indication information and the coefficient information of the at least one row that is not included in the second indication information. Optionally, the set A may be different for different R matrices $V_{2,1}, \ldots, V_{2,R}$. In a possible design, the method further includes: The second communications apparatus sends second configuration information, and the first communications device receives the second configuration information, where the second configuration information is used to indicate that: For an $m^{th}$ row, the location index information includes only one group of locations $C_{m,1}, \ldots, C_{m,K_r}$, and the group of locations $C_{m,1}, \ldots, C_{m,K_r}$ is used to indicate $K_{m,r}$ element locations on the $m^{th}$ row of each of the R matrices $V_{2,1}, \ldots, V_{2,R}$.

With reference to the first aspect or the second aspect, in a possible design, $$W_1 = \begin{bmatrix} X & 0 \\ 0 & X \end{bmatrix}$$

is a matrix of $N \times 2L$, $X = [b_{k_0} \ldots b_{k_{L-1}}]$ is a matrix of $$\frac{N}{2} \times L,$$

and $b_{k_i}$ ($0 \le i \le L-1$) belongs to a vector set $B = \{b_0, b_1, \ldots b_{M-1}\}$, the PMI further includes third indication information, the third indication information is used to indicate L vectors $b_{k_0}, \ldots, b_{k_{L-1}}$, M is a positive integer, and M is greater than or equal to L.

With reference to the first aspect or the second aspect, in a possible design, $V_{2,r} = [V_{2,r,1} \ldots V_{2,r,T}]$, where a $t^{th}$ column in $V_{2,r}$ is $V_{2,r,t} = [a_{r,1,t} \ldots a_{r,2L,t}]^T$, $1 \le t \le T$, $[\ ]^T$ represents transposing, and $a_{r,m,t}$ ($1 \le m \le 2L$) represents complex coefficients at locations on the $m^{th}$ row and the $t^{th}$ column of $V_{2,r}$.

In a possible design, the method further includes: The second communications apparatus sends third configuration information, and the first communications device receives the third configuration information, where the third configuration information is used to indicate that the location index information includes only R groups of locations, and an $r^{th}$ group of locations $C_{m,1}, \ldots, C_{m,K_r}$ is used to indicate $K_{m,r}$ element locations on at least two rows in $V_{2,r}$.

In a possible design, the method further includes: quantities of quantization bits of at least two relative values in the relative values that are of the coefficients and that are included in the second indication information are different. A beneficial effect is that quantization precision of a coefficient with a relatively large amplitude can be improved, quantization precision of a coefficient with a relatively small amplitude can be reduced, and a compromise between quantization precision and feedback overheads can be achieved.

Optionally, the foregoing method may be that: $m \in A$, $n \in A$, m is not equal to n, and it satisfies that a quantity of quantization bits of the relative values that are of all or some of coefficients $a_{r,m,t_{r,m,j}}$ at the $K_{m,r}-1$ element locations and the coefficient a $a_{r,m,\tau_{r,m}}$ first element location $\tau_{r,m}$ and that are included in the second indication information is different from a quantity of quantization bits of the relative values that are of all or some coefficients $a_{r,n,t_{r,n,j}}$ at the $K_{n,r}-1$ element locations and the coefficient $a_{r,n,\tau_{r,n}}$ at the first element location $\tau_{r,n}$ are included in the second indication information.

Optionally, the foregoing method may be that: In relative values that are of all or some coefficients at element locations, other than the third element location $\gamma_r$, in the element locations $$\bigcup_{m \in A} \{t_{r,m,1}, \ldots, t_{r,m,K_{m,r}}\}$$

and that are included in the second indication information, quantities of quantization bits of at least two relative values are different.

With reference to the first aspect or the second aspect, in a possible design, N is a quantity of antenna ports of the second communications apparatus, L is a quantity of vectors included in the $W_1$ matrix selected by the first communications apparatus, and a value of L may be configured by the second communications apparatus, or may be reported by the first communications apparatus.

With reference to the first aspect or the second aspect, in a possible design, the DFT transform may be completed by performing a DFT operation, or may be obtained by performing mathematical transform by multiplying a DFT matrix.

With reference to the first aspect or the second aspect, in a possible design, the DFT transform may be fast Fourier transform (FFT) transform. Calculation results are equivalent by using DFT transform or FFT transform.

With reference to the first aspect or the second aspect, in a possible design, the PMI includes a PMI 1 and a PMI 2, and the PMI 2 includes the first indication information and the second indication information. The PMI 1 includes the third indication information.

It should be noted that, in this embodiment of this application, in a description that A is used to determine B and in a similar description, there are a plurality of determining methods. For example, values of B corresponding to different values of A are pre-stored. Therefore, a corresponding value of B may be determined based on different values of A. Alternatively, a calculation rule is predefined, and a corresponding value of B may be calculated based on different values of A.

According to a third aspect, an embodiment of this application provides a first communications apparatus. The first communications apparatus includes a plurality of functional units, configured to correspondingly perform the precoding matrix index reporting method according to any one of the first aspect or the possible implementations of the first aspect.

According to a fourth aspect, an embodiment of this application provides a second communications apparatus. The second communications apparatus includes a plurality of functional units, configured to correspondingly perform the precoding matrix index reporting method according to any one of the second aspect or the possible implementations of the second aspect.

According to a fifth aspect, an embodiment of this application provides a first communications apparatus, configured to perform the precoding matrix index reporting method described in the first aspect. The first communications apparatus may include a memory, and a processor, a transmitter, and a receiver that are coupled to the memory. The transmitter is configured to send a signal to another communications apparatus, for example, a network device. The receiver is configured to receive a signal sent by the other communications apparatus, for example, the network device. The memory is configured to store implementation code of the precoding matrix index reporting method described in the first aspect. The processor is configured to execute program code stored in the memory, that is, perform the precoding matrix index reporting method described in any one of the first aspect or the possible implementations of the first aspect. Optionally, when performing a sending operation, the processor drives or controls the transmitter to perform the sending. Optionally, when performing a receiving operation, the processor drives or controls the receiver to perform the receiving.

According to a sixth aspect, an embodiment of this application provides a second communications apparatus, configured to perform the precoding matrix index reporting method described in the second aspect. The second communications apparatus may include a memory, and a processor, a transmitter, and a receiver that are coupled to the memory. The transmitter is configured to send a signal to another communications apparatus, for example, a terminal device. The receiver is configured to receive a signal sent by the other communications apparatus, for example, the terminal device. The memory is configured to store implementation code of the precoding matrix index reporting method described in the second aspect. The processor is configured to execute program code stored in the memory, that is, perform the precoding matrix index reporting method described in any one of the second aspect or the possible implementations of the second aspect. Optionally, when performing a sending operation, the processor drives or controls the transmitter to perform the sending. Optionally, when performing a receiving operation, the processor drives or controls the receiver to perform the receiving.

According to a seventh aspect, an embodiment of this application provides a communications system. The communications system includes a first communications apparatus and a second communications apparatus. The first communications apparatus includes the first communications apparatus according to the third aspect or the fifth aspect, and the second communications apparatus includes the second communications apparatus according to the fourth aspect or the sixth aspect.

According to an eighth aspect, an embodiment of this application provides a computer-readable storage medium. The computer-readable storage medium stores an instruction. When the instruction is run on a processor, the processor is enabled to perform the precoding matrix index reporting method described in the first aspect.

According to a ninth aspect, an embodiment of this application provides a computer-readable storage medium. The computer-readable storage medium stores an instruction. When the instruction is run on a processor, the processor is enabled to perform the precoding matrix index reporting method described in the second aspect.

According to a tenth aspect, an embodiment of this application provides a computer program including an instruction. When the program is run on a processor, the processor is enabled to perform the precoding matrix index reporting method described in the first aspect.

According to an eleventh aspect, an embodiment of this application provides a computer program including an instruction. When the program is run on a processor, the processor is enabled to perform the precoding matrix index reporting method described in the second aspect.

In a possible design, the first communications apparatus may be, but is not limited to, a terminal device. The second communications apparatus may be, but is not limited to, a network device.

In a possible design, the precoding matrix index reporting method may be applied to, but is not limited to, a MIMO system.

DESCRIPTION OF EMBODIMENTS

To facilitate understanding of embodiments of the present invention, a wireless communications system in the embodiments of the present invention is first described.

Figure 1:
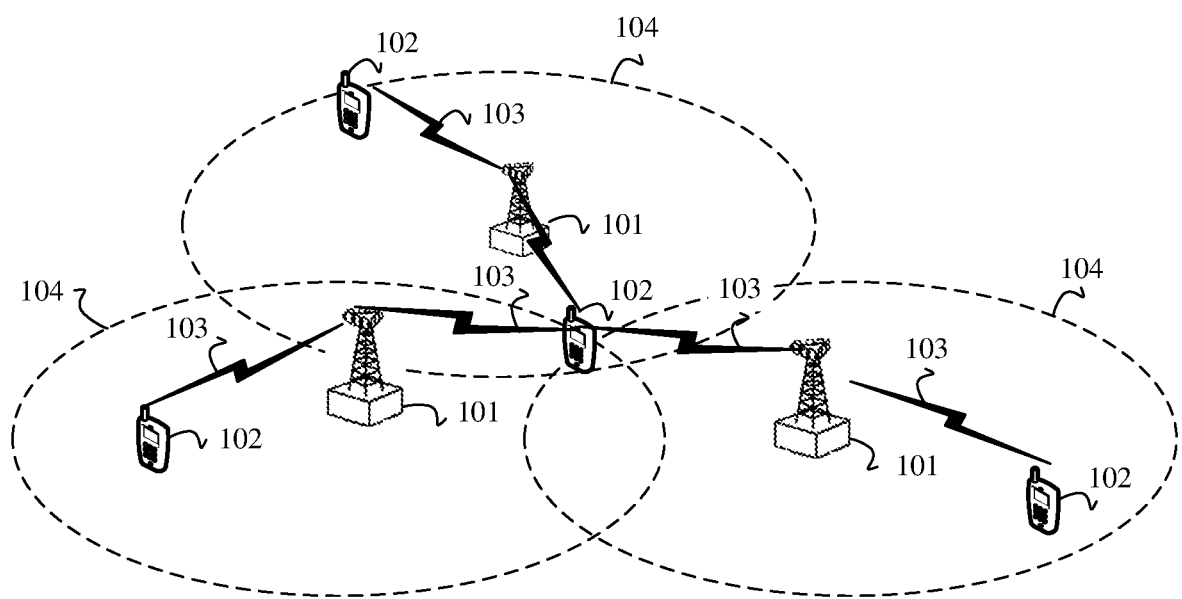
FIG. 1 is a schematic structural diagram of a wireless communications system according to an embodiment of the present invention.

FIG. 1 shows a wireless communications system according to an embodiment of the present invention. The wireless communications system 100 may operate in a licensed frequency band, or may operate in an unlicensed frequency band. The wireless communications system 100 is not limited to a long term evolution (LTE) system, and may further be a future evolved 5G system, a new radio (NR) system, or the like. It may be understood that a system capacity of the wireless communications system 100 can be increased by using the unlicensed frequency band. As shown in FIG. 1, the wireless communications system 100 includes one or more network devices 101 and one or more terminal devices 102.

The network device 101 may perform wireless communication with the terminal device 102 by using one or more antennas. Each network device 101 can provide communication coverage for a coverage area 104 corresponding to the network device 101. The coverage area 104 corresponding to the network device 101 may be divided into a plurality of sectors (sector). One sector corresponds to a portion of the coverage area (not shown).

In this embodiment of this application, the network device 101 may include a base transceiver station, a wireless transceiver, a basic service set (BSS), an extended service set (ESS), and a NodeB (Node B), an evolved NodeB (eNB or eNodeB), a next-generation node (gNB), or the like. The wireless communications system 100 may include the network devices 101 of several different types, for example, a macro base station, and a micro base station. The network device 101 may apply different wireless technologies, for example, a cell radio access technology or a WLAN radio access technology.

The terminal devices 102 may be distributed in the entire wireless communications system 100, and may be stationary or mobile. In the embodiments of this application, the terminal devices 102 may include a mobile device, a mobile station (mobile station), a mobile unit (mobile unit), a radio unit, a remote unit, a user agent, a mobile client, and the like.

In this application, the wireless communications system 100 may be a multi-beam communications system.

The network device 101 may have a large-scale antenna array, and control, by using a beamforming technology, the antenna array to form beams of different directions. To cover an entire cell 104, the network device 101 needs to use a plurality of beams of different directions.

For example, in a downlink process, the network device 101 may use beams of different directions in sequence to transmit a radio signal (for example, a downlink reference signal (RS) and/or a downlink synchronization signal block (SS block)), and the process is referred to as beam scanning. In addition, the terminal device 102 measures the transmit beams, to determine signal quality of the transmit beams that can be received by the terminal device 102, and the process is referred to as beam measurement.

In a future communications system, the terminal device 102 may also have an antenna array, and may also change between different beams for signal reception and transmission. In other words, in the wireless communications system 100, both the network device 101 and the terminal device 102 may use a plurality of beams for communication.

In this embodiment of this application, the wireless communications system 100 may support a multi-carrier (waveform signals of different frequencies) operation. A multi-carrier transmitter can simultaneously transmit modulated signals on a plurality of carriers. For example, multi-carrier signals modulated by using different wireless technologies may be carried by each communications connection 103. Each modulated signal can be sent on different carriers, or can carry control information (for example, reference signal information or control channel information), overhead information (Overhead Information), data, or the like.

In this embodiment of this application, the network device 101 sends a channel state information-reference signal (CSI-RS) to the terminal device 102, so that the terminal device 102 measures channel state information (CSI). The CSI includes one or more of a rank indicator (RI), a precoding matrix indicator (PMI), and a channel quality indicator (CQI). The terminal device 102 feeds back the CSI to the network device 101, and the CSI fed back by the terminal device 102 includes one or more of a PIM, an RI, and a CQI. The PMI is used for the network device 101 to determine a precoding matrix. The RI is used to recommend a quantity of layers of data to be sent by the network device 101 to the terminal device 102 on a same time-frequency resource. The CQI assists the network device 101 in determining a modulation and coding scheme, to improve transmission reliability and efficiency. Then, when sending downlink data to the terminal device 102, the network device 101 may perform precoding processing on the downlink data by using the precoding matrix determined based on the PMI or by using a precoding matrix jointly determined based on the PMI and other information. In a two-stage codebook structure, the PMI may be further divided into a PMI 1 and a PMI 2. The PMI 1 is a common parameter, and precoding matrices for data of all layers are the same. The PMI 2 is a non-common parameter, and precoding matrices for data of the layers are different.

Figure 2:
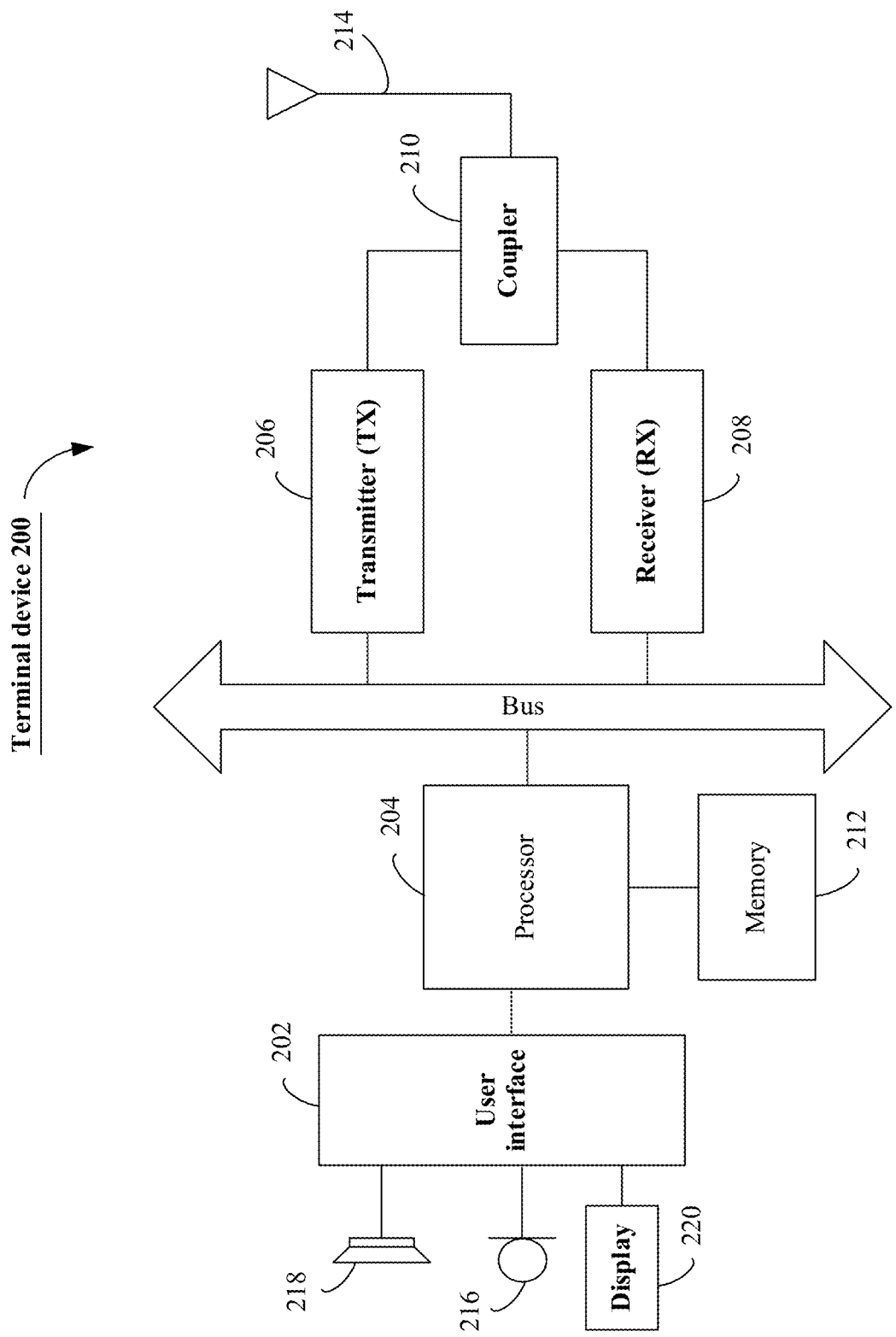
FIG. 2 is a schematic structural diagram of a terminal device according to an embodiment of the present invention.

FIG. 2 shows a terminal device according to an embodiment of this application. As shown in FIG. 2, the terminal device 200 may include: an input/output module (including an audio input/output module 218, a key input module 216 and a display 220), a user interface 202, one or more processors 204, a transmitter 206, a receiver 208, a coupler 210, an antenna 214, and a memory 212. The components may be connected by using a bus or in another manner. In FIG. 2, the connection by using a bus is used as an example.

The antenna 214 may be configured to: convert electromagnetic energy into an electromagnetic wave in free space, or convert an electromagnetic wave in free space into electromagnetic energy in a transmission line. The coupler 210 is configured to: divide a mobile communications signal received by the antenna 214 into a plurality of multipath signals, and allocate the plurality of multipath signals to a plurality of receivers 208.

The transmitter 206 may be configured to perform transmission processing on a signal output by the processor 204.

The receiver 208 may be configured to perform receiving processing on a mobile communications signal received by the antenna 214.

In this embodiment of this application, the transmitter 206 and the receiver 208 may be considered as a wireless modem. In the terminal device 200, there may be one or more transmitters 206 and one or more receivers 208.

In addition to the transmitter 206 and the receiver 208 shown in FIG. 2, the terminal device 200 may further include another communications component, for example, a GPS module, a Bluetooth module, a wireless high-fidelity (Wi-Fi) module, and the like. In addition to the foregoing wireless communications signal, the terminal device 200 may further support another wireless communications signal, for example, a satellite signal or a shortwave signal. In addition to the wireless communication, the terminal device 200 may further have a wired network interface (for example, a LAN interface) 201 to support wired communication.

The input/output module may be configured to implement interaction between the terminal device 200 and a user/an external environment, and may mainly include the audio input/output module 218, the key input module 216, the display 220, or the like. Specifically, the input/output module may further include: a camera, a touchscreen, a sensor, or the like. All the input and output modules communicate with the processor 204 by using the user interface 202.

The memory 212 is coupled to the processor 204, and is configured to store various software programs and/or a plurality of groups of instructions. Specifically, the memory 212 may include a high-speed random access memory, and may also include a nonvolatile memory, for example, one or more magnetic disk storage devices, a flash memory device, or another nonvolatile solid-state storage device. The memory 212 may store an operating system (briefly referred to as a system below), for example, an embedded operating system such as Android, IOS, WINDOWS, or LINUX. The memory 212 may further store a network communications program. The network communications program may be used to communicate with one or more adjuncts, one or more terminal devices, or one or more network devices. The memory 212 may further store a user interface program, and the user interface program may visually and vividly display content of an application program by using a graphical operation interface, and receive a control operation of the user on the application program by using input controls such as a menu, a dialog box, and a key.

In this embodiment of this application, the memory 212 may be configured to store an implementation program of a precoding matrix index reporting method provided in one or more embodiments of this application on the terminal device 200 side. For implementation of the precoding matrix index reporting method provided in the one or more embodiments of this application, refer to a subsequent embodiment.

The processor 204 may be configured to read and execute a computer-readable instruction. Specifically, the processor 204 may be configured to: invoke a program stored in the memory 212, for example, the implementation program of the system message receiving method provided in one or more embodiments of this application on the terminal device 200 side, and execute an instruction included in the program, to implement the method in the subsequent embodiment. The processor 204 may support one or more of global system for mobile communications (GSM) (2G) communication, wideband code division multiple access (WCDMA) (3G) communication, long term evolution (4G) communication, 5G communication, and the like. Optionally, when the processor 204 sends any message or data, the processor 204 performs the sending specifically by driving or controlling the transmitter 206. Optionally, when the processor 204 receives any message or data, the processor 204 performs the reception specifically by driving or controlling the receiver 208. Therefore, the processor 204 may be considered as a control center for performing sending or reception, and the transmitter 206 and the receiver 208 are specific executors of sending and reception operations.

It may be understood that, the terminal device 200 may be the terminal device 102 in the wireless communications system 100 shown in FIG. 1, and may be implemented as a mobile device, a mobile station (mobile station), a mobile unit (mobile unit), a radio unit, a remote unit, a user agent, a mobile client, or the like.

It should be noted that the terminal device 200 shown in FIG. 2 is merely an implementation of this embodiment of this application. In an actual application, the terminal device 200 may further include more or fewer components. This is not limited herein.

Figure 3:
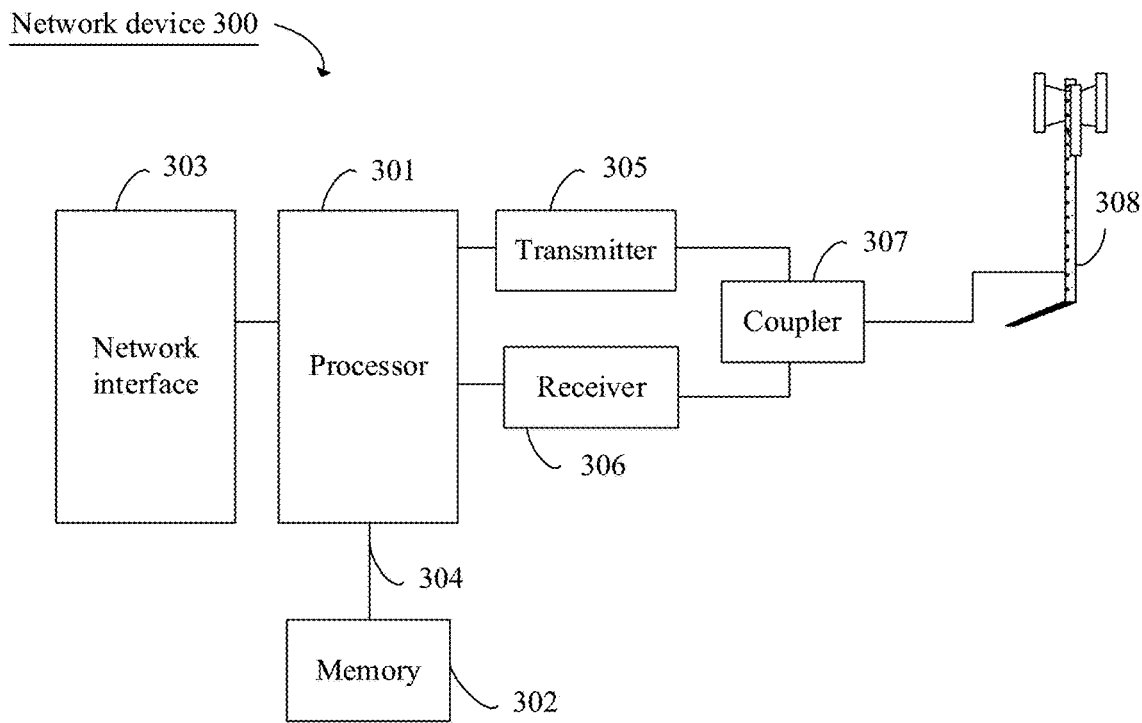
FIG. 3 is a schematic structural diagram of a network device according to an embodiment of the present invention.
Figure 4:
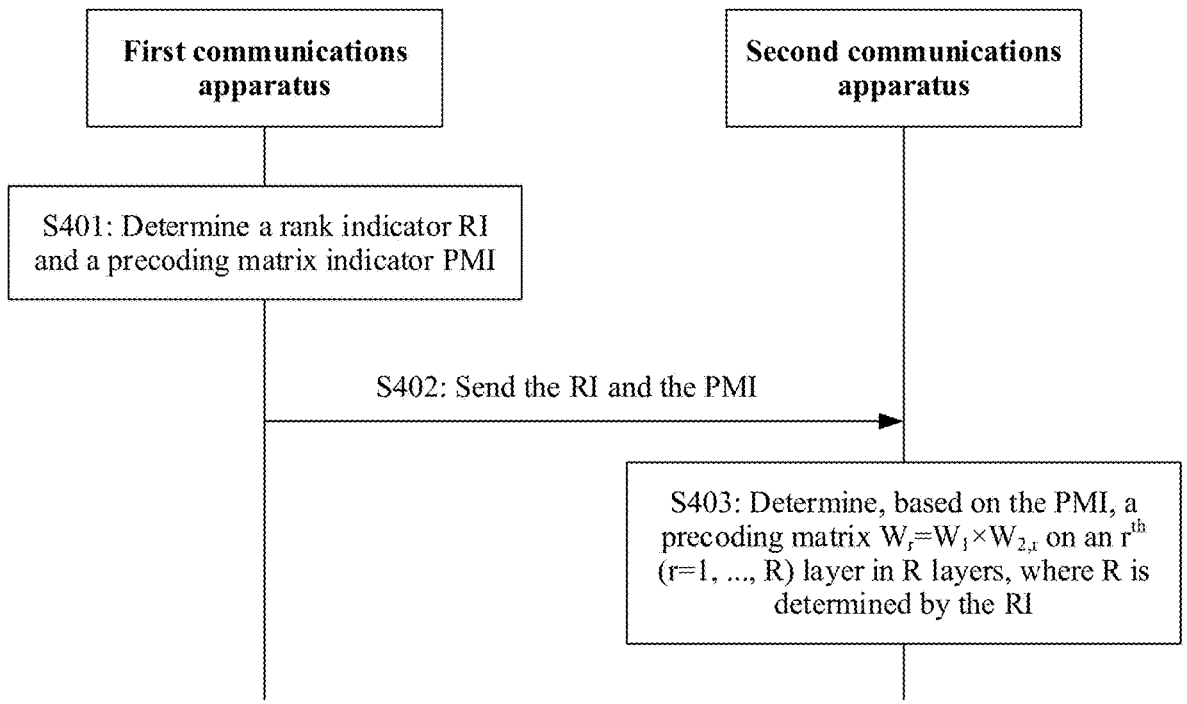
FIG. 4 is a schematic flowchart of a precoding matrix index reporting method according to an embodiment of the present invention.

FIG. 3 shows a network device according to an embodiment of this application. As shown in FIG. 3, the network device 300 may include: one or more processors 301, a memory 302, a network interface 303, a transmitter 305, a receiver 306, a coupler 307, and an antenna 308. The components may be connected by using a bus 304 or in another manner. In FIG. 3, the connection by using a bus is used as an example.

The network interface 303 may be configured for the network device 300 to communicate with another communications device, for example, another network device. Specifically, the network interface 303 may be a wired interface.

The transmitter 305 may be configured to perform transmission processing on a signal output by the processor 301, for example, signal modulation. The receiver 306 may be configured to perform receiving processing on a mobile communications signal received by the antenna 308, for example, signal demodulation. In some embodiments of this application, the transmitter 305 and the receiver 306 may be considered as a wireless modem. In the network device 300, there may be one or more transmitters 305 and one or more receivers 306. The antenna 308 may be configured to: convert electromagnetic energy in a transmission line into an electromagnetic wave in free space, or convert an electromagnetic wave in free space into electromagnetic energy in a transmission line. The coupler 307 may be configured to: divide a mobile communications signal into a plurality of multipath signals, and allocate the plurality of multipath signals to a plurality of receivers 306.

The memory 302 is coupled to the processor 301, and is configured to store various software programs and/or a plurality of groups of instructions. Specifically, the memory 302 may include a high-speed random access memory, and may also include a nonvolatile memory, for example, one or more magnetic disk storage devices, a flash memory device, or another nonvolatile solid-state storage device. The memory 302 may store an operating system (briefly referred to as a system below), for example, an embedded operating system such as uCOS, VxWorks, or RTLinux. The memory 302 may further store a network communications program. The network communications program may be used to communicate with one or more adjuncts, one or more terminal devices, or one or more network devices.

The processor 301 may be configured to: perform radio channel management, calling implementation, and communications link establishment and disconnecting, and provide cell handover control and the like for a user in a local control area. Specifically, the processor 301 may include: an administration module/communication module (AM/CM) (configured as a center of speech channel switching and information exchange), a basic module (BM) (configured to complete functions of call processing, signaling processing, radio resource management, radio link management, and circuit maintenance), a transcoder and submultiplexer (TCSM) (configured to complete functions of multiplexing, demultiplexing, and transcoding), or the like.

In this embodiment of this application, the processor 301 may be configured to read and execute a computer-readable instruction. Specifically, the processor 301 may be configured to: invoke a program stored in the memory 302, for example, an implementation program of a precoding matrix index reporting method provided in one or more embodiments of this application on the network device 300 side, and execute an instruction included in the program.

It may be understood that, the network device 300 may be the network device 101 in the wireless communications system 100 shown in FIG. 1, and may be implemented as a base transceiver station, a wireless transceiver, a basic service set (BSS), an extended service set (ESS), a NodeB, an eNodeB, a gNB, or the like.

It should be noted that the network device 300 shown in FIG. 3 is merely an implementation of this embodiment of this application. In an actual application, the network device 300 may further include more or fewer components. This is not limited herein.

It should be noted that a first communications apparatus described in the following embodiments may include, but is not limited to, the foregoing terminal device, and a second communications apparatus may include, but is not limited to, the foregoing network device.

Based on the embodiments respectively corresponding to the foregoing wireless communications system 100, the terminal device 200, and the network device 300, an embodiment of this application provides a precoding matrix index reporting method. The method includes, but is not limited to, the following steps.

S401: A first communications apparatus determines a rank indicator RI and a precoding matrix indicator PMI.

In this embodiment of the present invention, the first communications apparatus includes, but is not limited to, a terminal device.

Specifically, the first communications apparatus generates bit sequences corresponding to the RI and the PMI.

The PMI is used to determine R precoding matrices $W_1, \ldots, W_R$, and an $r^{th}$ precoding matrix $W_r$ in the R precoding matrices satisfies $W_r=W_1 \times W_{2,r}$, and $r \in \{1, \ldots, R\}$. For a specific manner of determining the precoding matrices $W_1, \ldots, W_R$ based on the PMI, refer to the description in the foregoing summary part. Details are not described herein again.

Herein, R represents a quantity of layers of data that is recommended by the first communications apparatus and that is transmitted by the second communications apparatus to the first communications apparatus on a same time-frequency resource. R is determined by the RI, the RI is a non-negative integer, and R is a positive integer.

The RI may be set from 0, and in this case, R=RI+1. For example, when RI=0 and R=1, it indicates that one layer of data is transmitted; and when RI=1 and R=2, it indicates that two layers of data are transmitted. For a specific determining manner, refer to the foregoing Table 1, Table 2, Table 3, or Table 4. Details are not described herein again.

$W_1$ is a matrix of N rows and 2L columns. Optionally, N is a quantity of ports of the second communications apparatus, L is a quantity of beams included in the $W_1$ matrix, and both N and L are positive integers. Optionally, N may be a value in a set $\{4, 8, 12, 16, 24, 32\}$. For the Wi matrix, refer to the following formula 1-1.

$$W_1 = \begin{bmatrix} X & 0 \\ 0 & X \end{bmatrix} \in C^{N \times 2L}, \qquad (1\text{-}1)$$

where the $W_1$ matrix is a matrix of N rows and 2L columns, $X=[b_{k_0} \ldots \ldots b_{k_{L-1}}]$ in the $W_1$ matrix is a matrix of N/2 rows and L columns, and each $b_{k_i}(0 \le i \le L-1)$ belongs to a vector set $B=\{b_0, b_1, \ldots b_{M-1}\}$. Herein, M is a positive integer, and M is greater than or equal to L. Therefore, for an expression of the $W_1$ matrix, refer to the following formula 1-2.

$$W_1 = \begin{bmatrix} b_{k_0} & \cdots & b_{k_{L-1}} & & 0 & \\ & 0 & & b_{k_0} & \cdots & b_{k_{L-1}} \end{bmatrix} \qquad (1\text{-}2)$$

Optionally, a vector in the vector set B is a discrete Fourier (DFT) vector.

The PMI includes third indication information, and the third indication information is used to indicate the L vectors $b_{k_0}, \ldots, b_{k_{L-1}}$.

Optionally, the first communications apparatus and the second communications apparatus prestore each vector in the set B and a mapping relationship between each vector and the PMI, and perform mapping based on values of some parameters in the PMI, to determine the L vectors $b_{k_0}, \ldots, b_{k_{L-1}}$ and further determine the $W_1$ matrix. Alternatively, a generation formula of each vector in the set B is predefined (for example, a table is predefined, and vectors in the set B may be generated by the table based on related parameters), and the first communications apparatus and the second communications apparatus obtain the L vectors $b_{k_0}, \ldots, b_{k_{L-1}}$ through calculation based on values of some parameters in the PMI, to further determine the $W_1$ matrix.

Specifically, the second communications apparatus sends a channel state information-reference signal CSI-RS, so that the first communications apparatus measures channel state information CSI. The CSI includes one or more of an RI, a PMI, and a CQI. In a two-stage codebook structure, the PMI includes a PMI 1 and a PMI 2, and is used to recommend a precoding matrix used when the second communications apparatus transmits data to the first communications apparatus. Because a channel has a frequency selection characteristic, precoding matrices indicated by PMIs are different at different frequency domain granularities in CSI feedback bandwidth. Optionally, the frequency domain granularity may be one resource block (RB), one subband (where one subband includes a plurality of consecutive RBs), or one resource block group (RBG, where one RBG includes a plurality of consecutive RBs).

Optionally, a precoding matrix at an $f^{th}$ frequency domain granularity may be transmit-end eigenvectors of a downlink channel matrix $H_f$ from the second communications apparatus to the first communications apparatus at the frequency domain granularity, that is, RI eigenvectors obtained by performing eigenvalue decomposition on $H_f^H H_f$, where f=1, . . . , F. Optionally, the precoding matrix at the $f^{th}$ frequency domain granularity may be obtained by transforming the transmit-end eigenvectors of the downlink channel matrix $H_f$ from the second communications apparatus to the first communications apparatus at the frequency domain granularity. For example, the precoding matrix at the frequency domain granularity is obtained based on a plurality of transmit-end eigenvectors of the first communications apparatuses (the precoding matrix may be obtained based on a minimum mean square error criterion, a zero forcing criterion, or another criterion). F is determined based on a quantity of frequency domain granularities of CSI feedback bandwidth of a first communications device and a second communications device. To represent R eigenvectors on an $f^{th}$ RB, the first communications apparatus first selects L beam vectors $b_{k_0} \ldots b_{k_{L-1}}$ to form the $W_1$ matrix. The L beam vectors may be orthogonal beam vectors, or may alternatively be non-orthogonal beam vectors. Therefore, the PMI 1 is used to indicate the L beam vectors $b_{k_0} \ldots b_{k_{L-1}}$ selected by the first communications apparatus. Selection of the L beams is the same for all frequency domain granularities in the CSI feedback bandwidth, and is also the same for all RI eigenvectors.

Optionally, based on the selected $W_1$, the first communications apparatus performs eigenvalue decomposition on $R_f=(H_f W_1)^H (H_f W_1) \in C^{2L \times 2L}$, and selects R eigenvectors from the eigenvalues to form the following 1-3 matrix:

$$\overline{W}_{2,f} = \begin{bmatrix} \overline{w}_{0,1,f} & \ldots & \overline{w}_{0,R,f} \\ \ldots & \ldots & \ldots \\ \overline{w}_{2L-1,1,f} & \ldots & \overline{w}_{2L-1,R,f} \end{bmatrix}, \quad (1\text{-}3)$$

where an $r^{th}$ column of $\overline{W}_{2,f}$ is an $r^{th}$ eigenvector of $R^f$, and $\overline{W}_{j,r,f}(r=1, \ldots, R; j=0, \ldots, 2L-1)$ is a coefficient of a matrix $\overline{W}_{2,f}$ in an $r^{th}$ column and a $(j+1)^{th}$ row, where the coefficient is a complex number, and includes an amplitude and a phase.

Optionally, after statistics collection, the first communications apparatus selects and reports a reference location $i_r$ (reporting of $i_r$ may be performed in the PMI 1 or the PMI 2) of a frequency domain coefficient for each column of $\overline{W}_{2,f}$, and all other 2L-1 coefficients in the column are normalized by using a coefficient at the coefficient reference location as a reference: $w_{j,r,f}=\overline{W}_{j,r,f}/\overline{W}_{i,r,f}$, to obtain a normalized $W_{2,f}$ matrix:

$$W_{2,f} = \begin{bmatrix} w_{0,1,f} & \ldots & w_{0,R,f} \\ \ldots & \ldots & \ldots \\ w_{2L-1,1,f} & \ldots & w_{2L-1,R,f} \end{bmatrix} \quad (1\text{-}4)$$

Optionally, the reference location of the frequency domain coefficient of each column may be on a row on which a coefficient with a maximum wideband amplitude in the column of coefficients is located. A wideband amplitude of a coefficient may be obtained by performing an average calculation, a square average calculation, or other operation on amplitudes that are obtained through statistics collection and that are of the coefficient at all F frequency domain granularities. Optionally, the reference location of the frequency domain coefficient of each column may alternatively be a coefficient location of a fixed row (for example, the first row) in the column. The foregoing method for selecting the reference location of the frequency domain coefficient is not limited in the solution of the present invention.

Optionally, the first communications apparatus does not perform the foregoing normalization operation on each column of $\overline{W}_{2,f}$, and directly obtains a $W_{2,f}$ matrix, that is, $W_{2,f}=\overline{W}_{2,f}$. There may be another solution for obtaining $W_{2,f}$ by using $\overline{W}_{2,f}$. This is not limited in the solution of the present invention.

After the $W_{2,f}$ matrix is determined, for an element $W_{j,r,f}$ (r=1, . . . , R; and j=0, . . . , 2L-1) in the $r^{th}$ column and the $(j+1)^{th}$ row of the matrix, values of the element at all the F frequency domain granularities are combined in series to form a vector $[w_{j,r,1}, \ldots, w_{j,r,F}]$ to form the following $W_{2,r}$ matrix shown in formula 1-4a:

$$W_{2,r} = \begin{bmatrix} w_{0,r,1} & \ldots & w_{0,r,F} \\ \ldots & \ldots & \ldots \\ w_{2L-1,r,1} & \ldots & w_{2L-1,r,F} \end{bmatrix} \quad (1\text{-}4a)$$

In this case, the matrix $W_1$ and an $f^{th}$ (f=1, . . . , F) column of the matrix $W_{2,r}$ constitute a precoding vector of an $r^{th}$ layer of data at the $f^{th}$ frequency domain granularity, that is, $W_r(f)=W_1 \times W_{2,r}(f)$, where X(f) represents extracting an $f^{th}$ column of a matrix X. Therefore, an expression $W_r=W_1 \times W_{2,r}$ is used. At a same frequency domain granularity f, precoding matrices: $[W_1(f), \ldots, W_R(f)]$ of all layers at the frequency domain granularity may also be obtained by splicing precoding vectors $W_r(f)$ of data of the layers.

After the vector $[w_{j,r,1}, \ldots, w_{j,r,F}]$ is determined, the first communications apparatus performs an IDFT (or inverse fast Fourier transform, IFFT) operation on the vector, to obtain a corresponding time-domain signal vector $[a_{r,j,1}, \ldots, a_{r,j,T}]$ (T is greater than or equal to F and is a minimum value of 2 raised to the power, and F is a positive integer), and the vector $[a_{r,j,1}, \ldots, a_{r,j,T}]$ is used as the $(j+1)^{th}$ row of the $V_{2,r}$ matrix, to obtain the time domain $V_{2,r}$ matrix corresponding to an $r^{th}$ column of the $W_{2,f}$ matrix. Refer to the following formulas 1-5:

$$V_{2,r} = \begin{bmatrix} a_{r,0,1} & \ldots & a_{r,0,T} \\ \ldots & \ldots & \ldots \\ a_{r,2L-1,1} & \ldots & a_{r,2L-1,T} \end{bmatrix}, \quad (1\text{-}5)$$

where $V_{2,r}$ is a matrix of 2L rows and T columns. It can be learned from the foregoing transform relationship that DFT transform is performed on an $l^{th}$ row of $V_{2,r}$ to obtain an $l^{th}$ row of $W_{2,r}$, and $l \in \{1, \ldots, 2L\}$. Herein, the DFT transform may be completed by performing a DFT operation, or may be obtained by performing mathematical transform by multiplying a DFT matrix. Optionally, the DFT transform may alternatively be FFT transform.

The PMI includes first indication information and second indication information, the first indication information includes location index information, and the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$. Herein, the element locations may be understood as time domain tap locations, and coefficients at the element locations are non-zero or greater than or equal to a predetermined value. An element on the $m^{th}$ row of $V_{2,r}$ at a location other than the element locations takes a predefined value (for example, 0). A quantity $K_{m,r}$ of the element locations may be a predefined value, or may be configured by the second communications apparatus for the first communications apparatus, or may be reported by the first communications apparatus. $K_{m,r}$ is a positive integer, and $K_{m,r}$ is less than T.

In a possible implementation, RI≥2, and for the $m^{th}$ row, the location index information indicates a group of locations $C_{m,1}, \ldots, C_{m,K_m}$, and the group of locations $C_{m,1}, \ldots, C_{m,K_m}$ is used to indicate $K_{m,r}$ element locations on an $m^{th}$ row of each of the R matrices $V_{2,1}, \ldots, V_{2,R}$, that is, $t_{r,m,i} = c_{m,i}$ and $K_{m,r} = K_m$, where $m \in \{1, \ldots, 2L\}$ and $i \in \{1, \ldots, K_m\}$. In other words, when the element locations on the $m^{th}$ row of the $V_{2,r}$ matrix are reported, for the $m^{th}$ row of all the R $V_{2,r}$ matrices, only one group of locations may be reported, that is, values of the reported $K_{m,r}$ element locations for different values of r are the same. As compared with a manner in which a group of locations on the $m^{th}$ row of each $V_{2,r}$ matrix is separately reported, feedback overheads of the PMI are reduced. For precoding matrices at different layers, locations of channel time-domain multipaths corresponding to a same beam (that is, a same row of the R matrices) are very close. Therefore, a method for reporting a group of locations for values on a same row of all the R matrices causes a relatively small performance loss. However, feedback overheads of the PMI can be greatly reduced.

Optionally, the location index information includes indication information of $M_m$ reference locations $(d_{m,1}, \ldots, d_{m,M_m})$ The indication information of the $M_m$ reference locations $(d_{m,1}, \ldots, d_{m,M_m})$ is used to indicate the group of locations $C_{m,1}, \ldots, C_{m,K_m}$ and $M_m$ is a positive integer less than T.

Optionally, for the $m^{th}$ row, the location index information further includes a window size $X_{m,n}$ associated with an $n^{th}$ (n=1, ..., $M_m$) reference location $d_{m,n}$ in the $M_m$ reference locations, the $M_m$ reference locations and the $M_m$ window sizes are used to determine the group of locations $C_{m,1}, \ldots, C_{m,K_m}$, and $X_{m,n}$ is a positive integer. Alternatively, a window size $X_{m,n}$ associated with an $n^{th}$ (n=1, ..., $M_m$) reference location $d_{m,n}$ in the $M_m$ reference locations is configured by using first configuration information, the $M_m$ reference locations and the $M_m$ window sizes are used to determine the group of locations $C_{m,1}, \ldots, C_{m,K_m}$, and $X_{m,n}$ is a positive integer. In this case, the $M_m$ window sizes may be configured by the second communications apparatus for the first communications apparatus by using configuration information.

Figure 5:
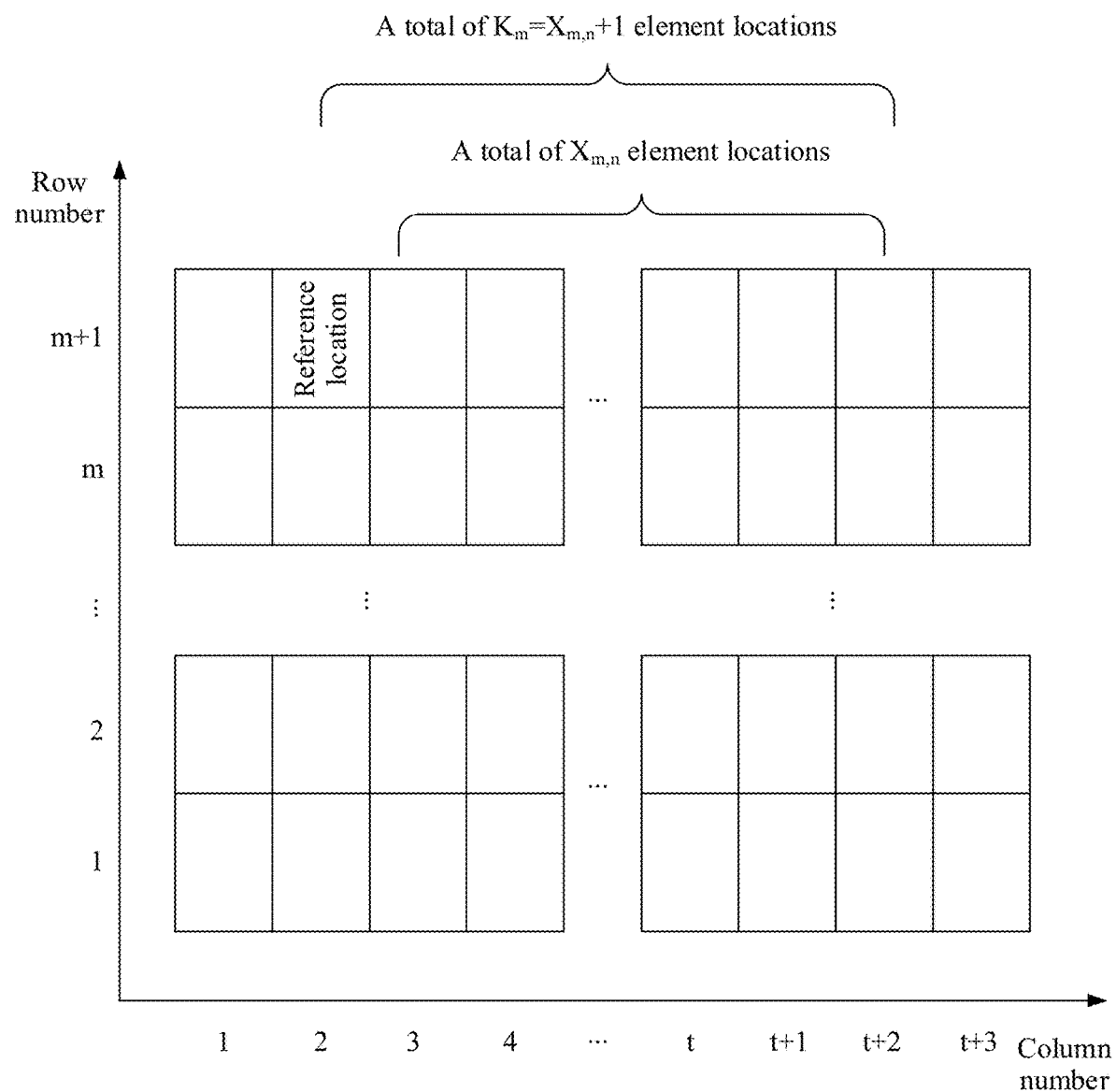
FIG. 5 is a schematic diagram of determining an element location based on a reference location and a window size according to an embodiment of the present invention.
Figure 6:
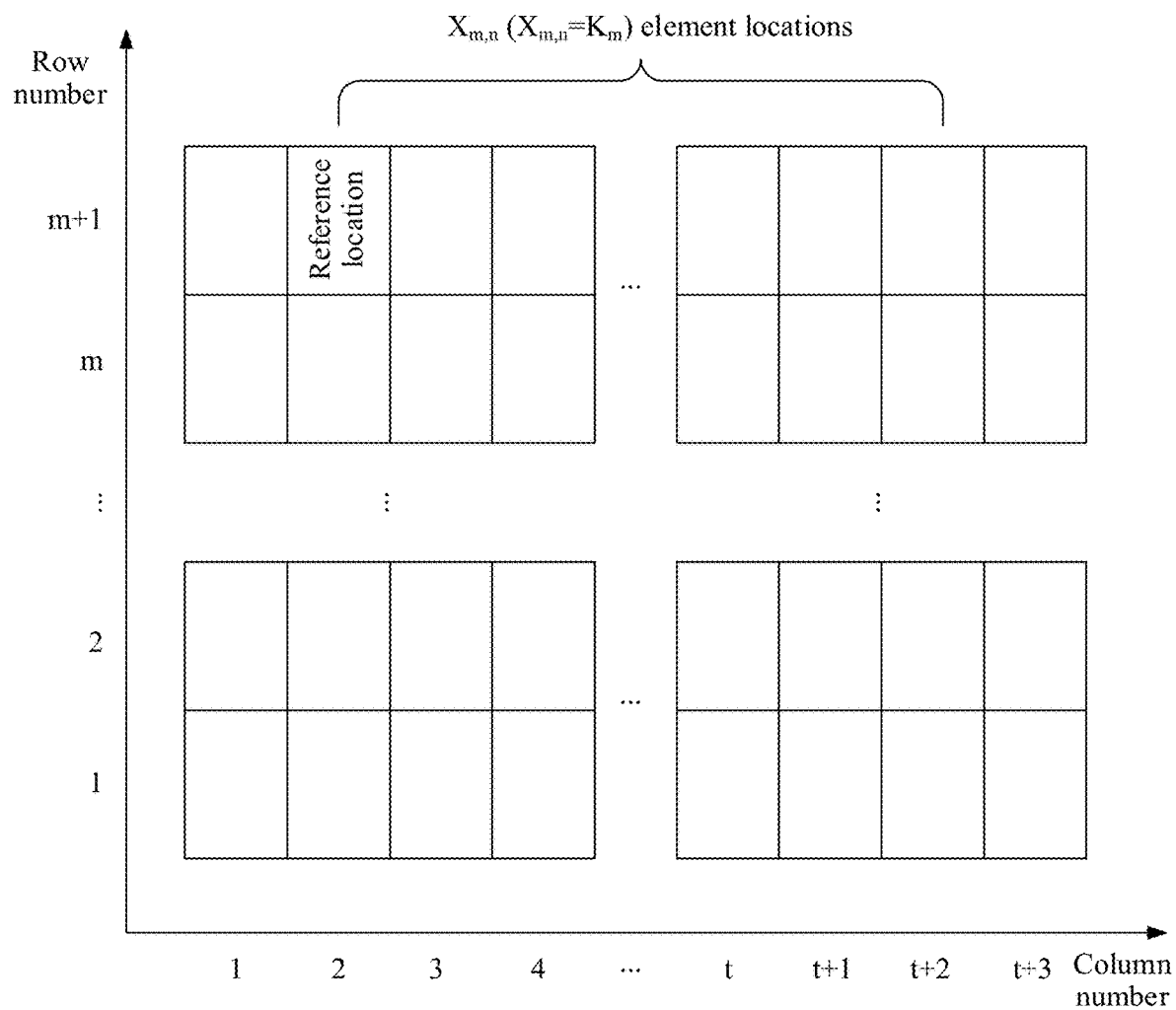
FIG. 6 is another schematic diagram of determining an element location based on a reference location and a window size according to an embodiment of the present invention.
Figure 7:
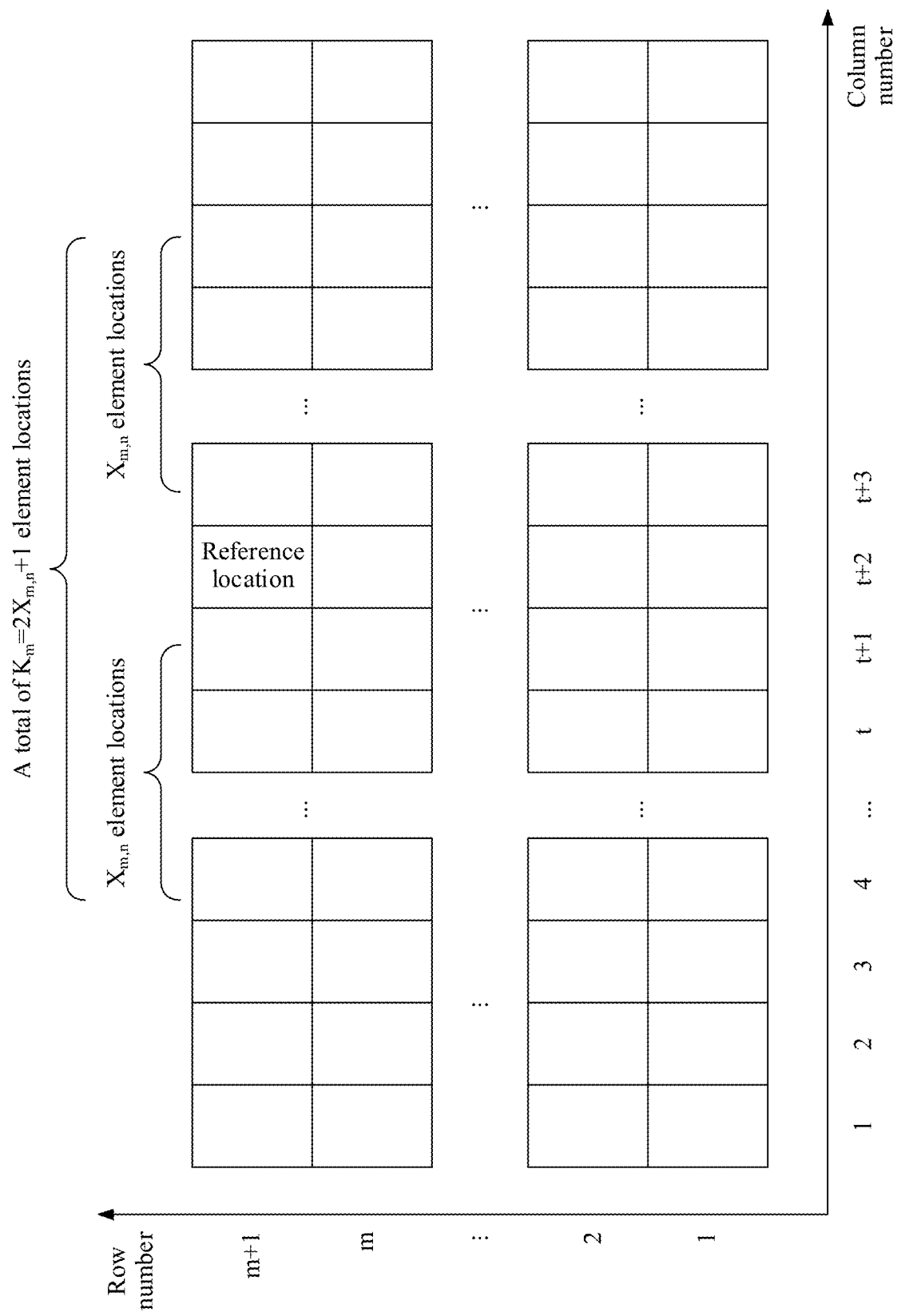
FIG. 7 is another schematic diagram of determining an element location based on a reference location and a window size according to an embodiment of the present invention.
Figure 8:
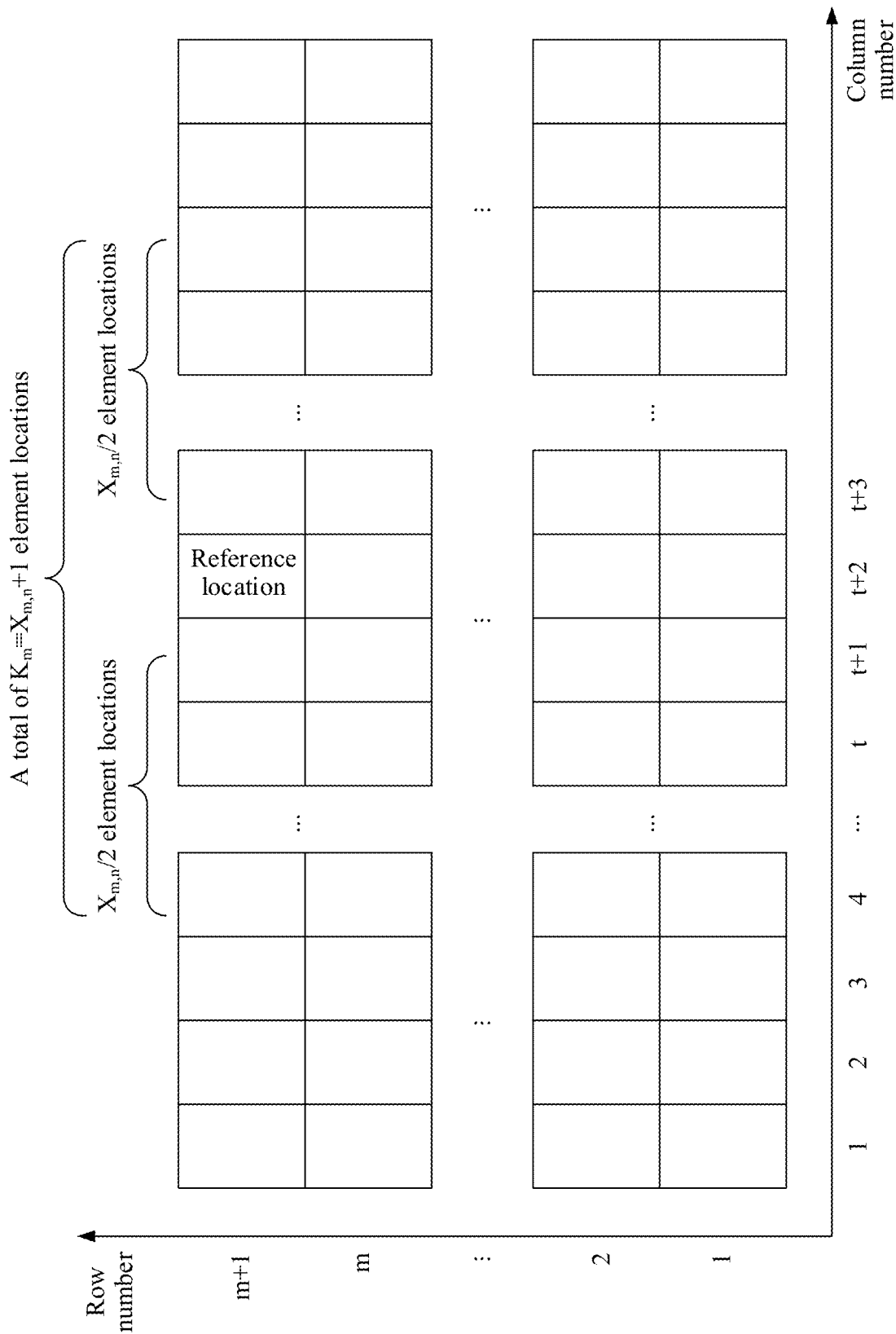
FIG. 8 is another schematic diagram of determining an element location based on a reference location and a window size according to an embodiment of the present invention.

There are a plurality of methods for determining the $K_m$ locations $C_{m,1}, \ldots, C_{m,K_m}$ based on the $M_m$ window sizes $X_{m,n}$ and the $M_m$ reference locations. $M_m=1$ is used as an example. Optionally, as shown in FIG. 5, $X_{m,n}$ locations starting from a reference location (including the reference location) are counted along a direction in which a column number of the matrix $V_{2,r}$ increases, and the $X_{m,n}$ locations are included in the $K_m$ locations $C_{m,1}, \ldots, C_{m,K_m}$. In this case, $1+X_{m,n}=K_m$. Optionally, referring to FIG. 6, $X_{m,n}-1$ locations starting from a reference location (including the reference location) are counted along a direction in which a column number of the matrix $V_{2,r}$ increases, and the $X_{m,n}$ locations are the $K_m$ locations $C_{m,1}, \ldots, C_{m,K_m}$. In this case, $X_{m,n}=K_m$. Similar to the foregoing two methods, $X_{m,n}$ locations starting from a reference location may alternatively be counted along a direction in which a column number of the matrix $V_{2,r}$ decreases. Details are not described again. Optionally, as shown in FIG. 7, a reference location is used as a central location, $X_{m,n}$ locations are counted respectively along a direction in which a column number of the matrix $V_{2,r}$ decreases and along a direction in which a column number of the matrix $V_{2,r}$ increases, and the $2X_{m,n}+1$ locations are the $K_m$ locations $C_{m,1}, \ldots, C_{m,K_m}$. Optionally, as shown in FIG. 8, a reference location is used as a central location, $X_{m,n}/2$ locations are counted respectively along a direction in which a column number of the matrix $V_{2,r}$ decreases and along a direction in which a column number of the matrix $V_{2,r}$ increases, and the $X_{m,n}+1$ locations are the $K_m$ locations $C_{m,1}, \ldots, C_{m,K_m}$. There may be another determining manner. This is not excluded herein.

Optionally, when a quantity $M_m$ of the reference locations is greater than 1, the location index information includes absolute location information of one first reference location in the $M_m$ reference locations; and relative location information that is of each of $M_m-1$ reference locations, other than the first reference location, in the $M_m$ reference locations and that is relative to the first reference location. During implementation of this embodiment of the present invention, due to a time domain characteristic of a channel, that is, delays of a plurality of sub-paths of the channel in time domain are usually relatively centralized, a value interval of relative location information of the $M_m-1$ elements is far less than a value interval of absolute location information. Therefore, a quantity of quantization bits of quantized location information can be reduced in a manner of reporting the relative location information, thereby reducing feedback overheads of the PMI. For example, if there are a total of 64 sampling points in time domain in terms of multipath delays of a channel, it indicates that one piece of absolute location information of the element needs to be represented by using 6 bits. When values of the multipath delays of the channel are relatively centralized, for example, the multipath delays of the channel are all within 16 sampling points after the first absolute location, each piece of relative location information of the element needs to be represented by using 4 bits. Therefore, feedback overheads of the PMI can be reduced by reporting the relative location information.

Optionally, the location index information further includes $G_m$ groups of fourth indication information, and an $n^{th}$ (1≤n≤$G_m$) group of fourth indication information is used to indicate $Z_{m,n}$ element locations selected from $Y_{m,n}$ element locations, where the $Y_{m,n}$ element locations are determined based on an $n^{th}$ reference location in the $G_m$ reference locations and a window size $X_{m,n}$ associated with the $n^{th}$ reference location, $Z_{m,n}$ is a positive integer less than or equal to $Y_{m,n}$, and the $G_m$ reference locations, the $G_m$ window sizes, and the $G_m$ pieces of fourth indication information are used to determine the group of locations $C_{m,1}, \ldots, C_{m,K_m}$. In this case, when not all element locations in a time domain window are selected as $K_{m,r}$ element locations $t_{r,m,1}, \ldots, t_{r,m,K_{m,r}}$, actually selected $K_{m,r}$ element locations $t_{r,m,1}, \ldots, t_{r,m,K_{m,r}}$ need to be additionally reported.

In another possible implementation, $R \geq 1$, and the location index information indicates R groups of locations, where an $r^{th}$ group of locations $C_{r,1}, \ldots, C_{r,K_r}$ is used to indicate the $K_{m,r}$ element locations on at least two rows in $V_{2,r}$, that is $n \in \{1, \ldots, 2L\} m \in \{1, \ldots, 2L\}$, and $n \neq m$, and it satisfies that $t_{r,m,i} = t_{r,n,i} = c_{r,i}$ $i \in \{1, \ldots, K_{m,r}\}$, and $r \in \{1, \ldots, R\}$. For at least two rows in each of the R matrices $V_{2,1}, \ldots, V_{2,R}$, only one group of locations may be reported. As compared with a manner in which a group of locations on each row of the matrix $V_{2,r}$ is separately reported, feedback overheads of the PMI are reduced. Further, optionally, for 2L−1 rows of an $r^{th}$ $V_{2,r}$ matrix, only one group of locations is reported, that is, $t_{r,m,i} = C_{r,K_r}$, and $K_{m,r} = K_r$. As compared with a manner in which a group of locations on each row of the matrix $V_{2,r}$ at each of R layers is separately reported, feedback overheads of the PMI are reduced. When multipaths of channels between the first communications apparatus and the second communications apparatus are extremely centralized, element locations corresponding to beams are very close. Therefore, only one group of locations is reported for at least two rows, so that a performance loss caused is small, but reporting overheads are reduced.

Optionally, the two rows in at least two rows of each matrix may be different two rows in the R matrices. For example, in the matrix $V_{2,1}$, a reported group of locations indicates element locations on an $(n1)^{th}$ row and an $(m1)^{th}$ row; and in the matrix $V_{2,2}$, a reported group of locations indicates element locations on an $(n_2)^{th}$ row and an $(m2)^{th}$ row. Optionally, the two rows may be the same two rows in the R matrices. During implementation of this embodiment of the present invention, for at least two rows in each of the R matrices $V_{2,1}, \ldots, V_{2,R}$, only one group of locations may be reported. As compared with a manner in which a group of locations on each row of the matrix $V_{2,r}$ is separately reported, feedback overheads of the PMI are reduced. Further, optionally, for 2L-1 rows of an $r^{th}$ $V_{2,r}$ matrix, only one group of locations is reported, that is $t_{r,m,i} = C_{r,K_r}$, and $K_{m,r} = K_r$, that feedback overheads of the PMI can be further reduced. Similarly, the 2L-1 rows may be different 2L-1 rows in the R matrices, or may be the same 2L-1 rows.

Optionally, the location index information includes indication information of $M_r$ reference locations $(d_{r,1}, \ldots, d_{r,M_r})$. The indication information of the $M_r$ reference locations $(d_{r,1}, \ldots, d_{r,M_r})$ is used to indicate an $r^{th}$ group of locations $C_{r,1}, \ldots, C_{r,K_r}$ in the R groups of locations, and $M_r$ is a positive integer less than T.

Optionally, the location index information further includes a window size $X_{r,n}$ associated with an $n^{th}$ $(n=1, \ldots, M_r)$ reference location $d_{r,n}$ in the $M_r$ reference locations, the $M_r$ reference locations and the $M_r$ window sizes are used to determine the $r^{th}$ group of locations $c_{r,1}, \ldots, c_{r,K_r}$ in the R groups of locations, and $X_{r,n}$ is a positive integer; or a window size $X_{r,n}$ associated with an $n^{th}$ $(n=1, \ldots, M_r)$ reference location $d_{r,n}$ in the $M_r$ reference locations is configured by using first configuration information, the $M_r$ reference locations and the $M_r$ window sizes are used to determine the $r^{th}$ group of locations $c_{r,1}, \ldots, c_{r,K_r}$ in the R groups of locations, and $X_{r,n}$ is a positive integer. In this case, the $M_r$ window sizes may be configured by the second communications apparatus for the first communications apparatus by using configuration information.

There are a plurality of methods for determining the $K_r$ locations $C_{r,1}, \ldots, C_{r,K_r}$ based on the $M_r$ window sizes $X_{r,n}$ and the $M_r$ reference locations. $M_r=1$ is used as an example.

Optionally, $X_{r,n}$ locations starting from a reference location (including the reference location) are counted along a direction in which a column number of the matrix $V_{2,r}$ increases, where the $X_{r,n}$ locations are included in the $K_r$ locations $C_{r,1}, \ldots, C_{r,K_r}$. In this case, $1+X_{r,n}=K_r$. Optionally, $X_{r,n}-1$ locations starting from a reference location (including the reference location) are counted along a direction in which a column number of the matrix $V_{2,r}$ increases, and the $X_{r,n}$ locations are the $K_r$ locations $C_{r,1}, \ldots, C_{r,K_r}$. In this case, $X_{r,n}=K_r$. Similar to the foregoing two methods, $X_{r,n}$ locations starting from a reference location may alternatively be counted along a direction in which a column number of the matrix $V_{2,r}$ decreases. Details are not described again. Optionally, a reference location is used as a central location, $X_{r,n}$ locations are counted respectively along a direction in which a column number of the matrix $V_{2,r}$ decreases and along a direction in which a column number of the matrix $V_{2,r}$ increases, and the $2X_{r,n}+1$ locations are the Kr locations $C_{r,1}, \ldots, C_{r,K_r}$. Optionally, a reference location is used as a central location, $X_{r,n}/2$ locations are counted respectively along a direction in which a column number of the matrix $V_{2,r}$ decreases and along a direction in which a column number of the matrix $V_{2,r}$ increases, and the $X_{r,n}+1$ locations are the $K_r$ locations $C_{r,1}, \ldots, C_{r,K_r}$. There may be another determining manner. This is not excluded herein. For a specific calculation manner, refer to the calculation manners shown in FIG. 5 to FIG. 8. Details are not described herein again.

Optionally, a value of the window size $X_{m,n}$ or $X_{r,n}$ may be predefined, configured by the second communications apparatus, or reported by the first communications apparatus. In this embodiment of the present invention, the window size is used to represent a length of a time domain window including a plurality of element locations.

When a quantity $M_r$ of the reference locations is greater than 1, the location index information includes absolute location information of one first reference location in the $M_r$ reference locations, and relative location information that is of each of $M_r-1$ reference locations, other than the first reference location, in the $M_r$ reference locations and that is relative to the first reference location. For meanings of the absolute location information and the relative location information, refer to the foregoing summary part. Details are not described again. During implementation of this embodiment of the present invention, due to a time domain characteristic of a channel, that is, delays of a plurality of sub-paths of the channel in time domain are usually relatively centralized, a value interval of relative location information of the $M_r-1$ elements is far less than a value interval of absolute location information. Therefore, a quantity of quantization bits of quantized location information can be reduced in a manner of reporting the relative location information, thereby reducing feedback overheads of the PMI. For example, if there are a total of 64 sampling points in time domain in terms of multipath delays of a channel, it indicates that one piece of absolute location information of the element needs to be represented by using 6 bits. When values of the multipath delays of the channel are relatively centralized, for example, the multipath delays of the channel are all within 16 sampling points after the first absolute location, each piece of relative location information of the element needs to be represented by using 4 bits. Therefore, feedback overheads of the PMI can be reduced by reporting the relative location information.

With reference to the first aspect or the second aspect, in a possible design, the location index information further includes $G_r$ groups of fourth indication information, and an $n^{th}$ ($1 \leq n \leq G_r$) group of fourth indication information is used to indicate $Z_{r,n}$ element locations selected from $Y_{r,n}$ element locations, where the $Y_{r,n}$ element locations are determined based on an $n^{th}$ reference location in the $G_r$ reference locations and a window size $X_{r,n}$ associated with the $n^{th}$ reference location, $Z_{r,n}$ is a positive integer less than or equal to $Y_{r,n}$, and the $G_r$ reference locations, the $G_r$ window sizes, and the $G_r$ pieces of fourth indication information are used to determine the $r^{th}$ group of locations $C_{r,1}, \ldots, C_{r,K_r}$ in the R groups of locations. In this case, when not all element locations in a time domain window are selected as $K_{m,r}$ element locations $t_{r,m,1}, \ldots, t_{r,m,K_{m,r}}$, actually selected $K_{m,r}$ element locations $t_{r,m,1}, \ldots, t_{r,m,K_{m,r}}$ need to be additionally reported.

When $M_m > 1$ or $M_r > 1$, reporting manners of the $M_m$ or $M_r$ reference locations include, but are not limited to, the following two manners. A first reporting manner is that: The $M_m$ or $M_r$ reference locations are reported in an independent reporting manner, that is, absolute values at 1 to T (or 0 to T-1) are separately reported for each reference location. Optionally, a quantity of quantization bits of each absolute value is $\lceil \log_2(T) \rceil$ bits. A second reporting manner is that: The $M_m$ or $M_r$ reference locations may be reported in a relative location reporting manner, that is, an absolute value is reported for one (or a predefined location) of the $M_m$ or $M_r$ reference locations, and relative location information relative to the one (or the predefined location) reference location is reported for other $M_m-1$ or $M_n-1$ reference locations. Optionally, a quantity of quantization bits of the absolute value is $\lceil \log_2(T) \rceil$, and a quantity of quantization bits of the relative location is $\lceil \log_2(T_0) \rceil$ bits, where $\lceil \log_2 T \rceil > \lceil \log_2 T_0 \rceil$. An advantage of the second reporting manner is as follows: When locations of time domain windows are very close, a quantity of bits required for reporting the relative location information is less than a quantity of bits required for reporting the absolute location information, so that reporting overheads can be reduced. Optionally, the relative location information may be a relative value calculated in a manner of calculating a difference, calculating a quotient, or the like.

After $K_{m,r}$ element locations of each row are determined, a coefficient at each element location further needs to be indicated. The coefficient herein is a complex coefficient, and includes a coefficient amplitude and a coefficient phase. The second indication information is used to indicate $K_{m,r}$ complex coefficients $a_{r,m,t_{r,m,j}}$ at the element locations $t_{r,m,1}, \ldots, t_{r,m,K_{m,r}}$ on the $m^{th}$ row of $V_{2,r}$, and $V_{2,r}$ is determined based on the $K_{m,r}$ element locations and the $K_{m,r}$ complex coefficients $a_{r,m,t_{r,m,j}}$, $m \in \{1, \ldots, 2L\}$, and $i \in \{1, \ldots, K_{m,r}\}$.

In a possible implementation, the first indication information further includes indication information of $|A|$ first element locations $\tau_{r,m}$ and one second element location $\gamma_r$ of $V_{2,r}$, $m \in A$, the set A is a non-empty subset of a set $\{1, \ldots, 2L\}$, $|A|$ represents a quantity of elements in the set A, and $r \in \{1, \ldots, R\}$. $\tau_{r,m}$ is an element location with a maximum coefficient amplitude $|a_{r,m,t_{r,m,j}}|$ in the $K_{m,r}$ element locations $t_{r,m,1}, \ldots, t_{r,m,K_{m,r}}$, and the second element location $\gamma_r$ is an element location with a maximum coefficient amplitude $|a_{r,m,\tau_{r,m}}|$ in the $|A|$ first element locations $\tau_{r,m}$. The second indication information includes relative values of all or some coefficients $a_{r,m,t_{r,m,j}}$ at $K_{m,r}-1$ element locations, other than the first element location $\tau_{r,m}$ in the $K_{m,r}$ element locations $t_{r,m,1}, \ldots, t_{r,m,K_{m,r}}$ and a coefficient $a_{r,m,\tau_{r,m}}$ at the first element location $\tau_{r,m}$. Herein, the relative values may be a quantized value of a difference or a quotient, for example, a quantized value of $a_{r,m,t_{r,m,j}}/a_{r,m,\tau_{r,m}}$, a quantized value of $a_{r,m,t_{r,m,j}}/a_{r,m,\tau_{r,m}}$ a quantized value of $a_{r,m,t_{r,m,j}} - a_{r,m,\tau_{r,m}}$ or a quantized value of $a_{r,m,\tau_{r,m}} - a_{r,m,t_{r,m,j}}$. The second indication information further includes relative values of coefficients $a_{r,m,\tau_{r,m}}$ at $|A|-1$ first element locations, other than the second element location $\gamma_r$, in the $|A|$ first element locations $\tau_{r,m}$ and a coefficient $a_{r,m,\gamma_r}$ at the second element location $\gamma_r$. Herein, the relative value may be a difference or a quotient, for example, a quantized value of $a_{r,m,\tau_{r,m}}/a_{r,m,\gamma_r}$, a quantized value of $a_{r,m,\gamma_r}/a_{r,m,\tau_{r,m}}$, a quantized value of $a_{r,m,\tau_{r,m}} - a_{r,m,\gamma_r}$, or a quantized value of $a_{r,m,\gamma_r}/a_{r,m,\tau_{r,m}}$. In another possible implementation, the first indication information includes a third element location $\gamma_r$ of $V_{2,r}$, and $\gamma_r$ is used to indicate an element location with a maximum coefficient amplitude $|a_{r,m,t_{r,m,j}}|$ at element locations $$\bigcup_{m \in A} \{t_{r,m,1}, \ldots, t_{r,m,K_{m,r}}\}.$$

The second indication information includes relative values of all or some coefficients at element locations $$\bigcup_{m \in A} \{t_{r,m,1}, \ldots, t_{r,m,K_{m,r}}\},$$

other than the third element location $\gamma_r$, in all the element locations $$\bigcup_{m \in A} \{t_{r,m,1}, \ldots, t_{r,m,K_{m,r}}\}$$

and a coefficient at the location $\gamma_r$, and $$\bigcup_{m \in A} \{t_{r,m,1}, \ldots, t_{r,m,K_{m,r}}\}$$

is a set obtained by obtaining a union set of sets $\{t_{r,m,1}, \ldots, t_{r,m,K_m}\}$ corresponding to all elements m that belong to the set A. For example, $$\bigcup_{m \in \{1,2\}} \{a_{m,1}, a_{m,2}\} = \{a_{1,1}, a_{1,2}, a_{2,1}, a_{2,2}\}.$$

Herein, the relative value may be a difference or a quotient.

Figure 9:
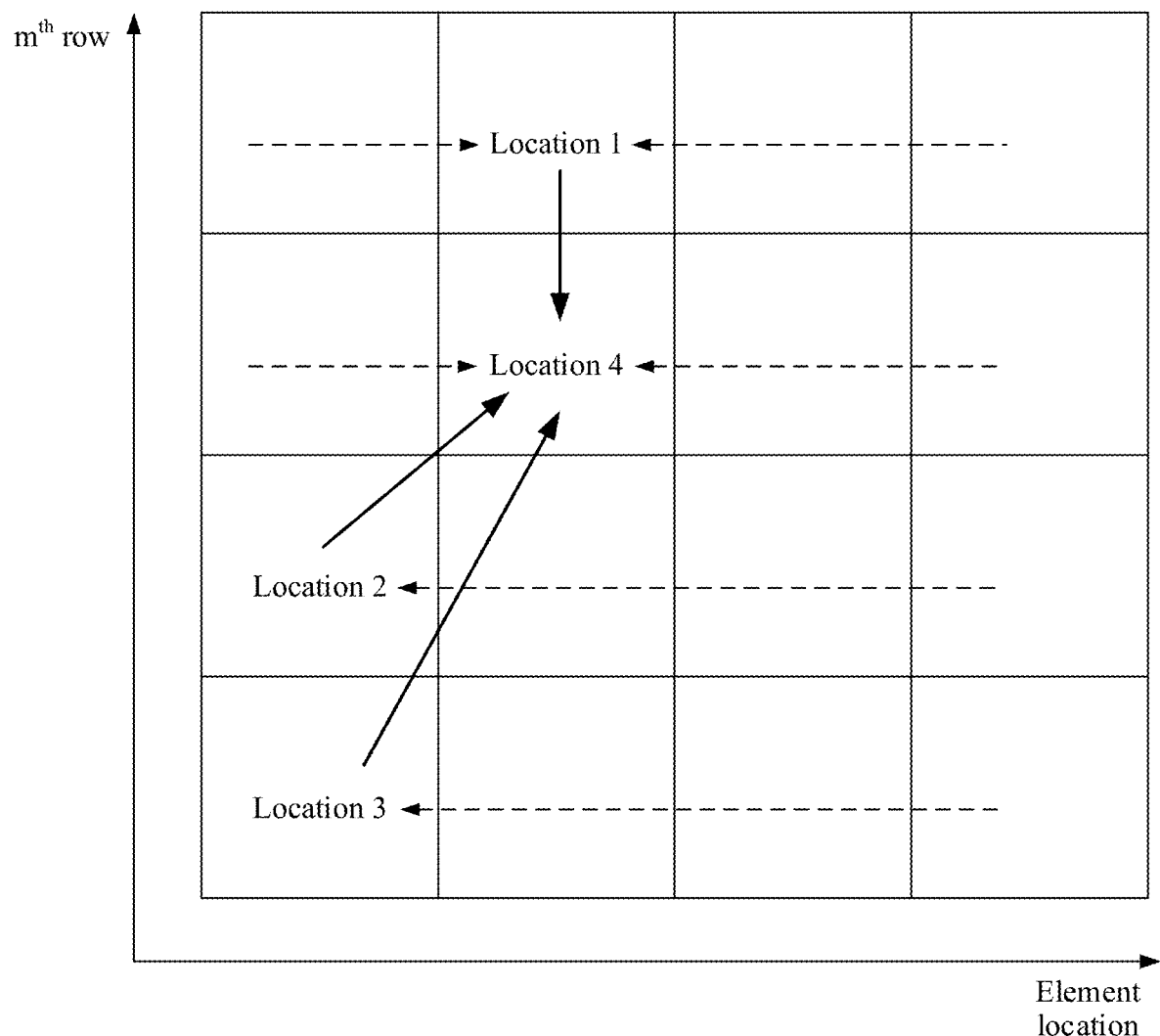
FIG. 9 is a schematic diagram of a reporting manner in which locations are normalized according to an embodiment of the present invention.

For example, as shown in FIG. 9 (an example in which $K_{m,r}$ element locations selected for all rows are the same is used), each grid in FIG. 9 represents an element at a selected element location. The first indication information separately indicates corresponding element locations on 2L-1 rows, and indicates element locations $\tau_{r,m}$ (a location 1, a location 2, and a location 3 in the figure) with maximum coefficient amplitudes at $K_{m,r}$ element locations $t_{r,m,1}, \ldots, t_{r,m,K_{m,r}}$ corresponding to the $m^{th}$ row. The second indication information indicates a quantized value (shown by a dashed line in the figure) of a normalized value $a_{r,m,t_{r,m,j}}/a_{r,m,\tau_{r,m}}$ that is of all or some coefficients at locations, other than $\tau_{r,m}$, in $t_{r,m,l}, \ldots, t_{r,m,K_{m,r}}$ on the row and that is relative to a coefficient at the location $\tau_{r,m}$. In addition, the first indication information further indicates a location $\gamma_r$ (a location 4 in the figure) corresponding to a maximum coefficient amplitude in 2L−1 $\tau_{r,m}$, and the second indication information further indicates a quantized value (shown by a solid line in the figure) of a normalized value $a_{r,m,\tau_{r,m}}/a_{r,m,\gamma_r}$ that is of a coefficient at 2L−2 $\tau_{r,m}$ locations other than $\gamma_r$ and that is relative to a coefficient at the location $\gamma_r$. In this embodiment, |A|=2L−1 is used as an example for description.

An advantage of the method is that: If an amplitude of a coefficient on a row of the $V_{2,r}$ matrix is relatively small compared with an amplitude of a coefficient on another row, by using the normalization method, not all coefficients on the row need to be normalized and quantized to 0, thereby improving feedback precision of the PMI.

Figure 10:
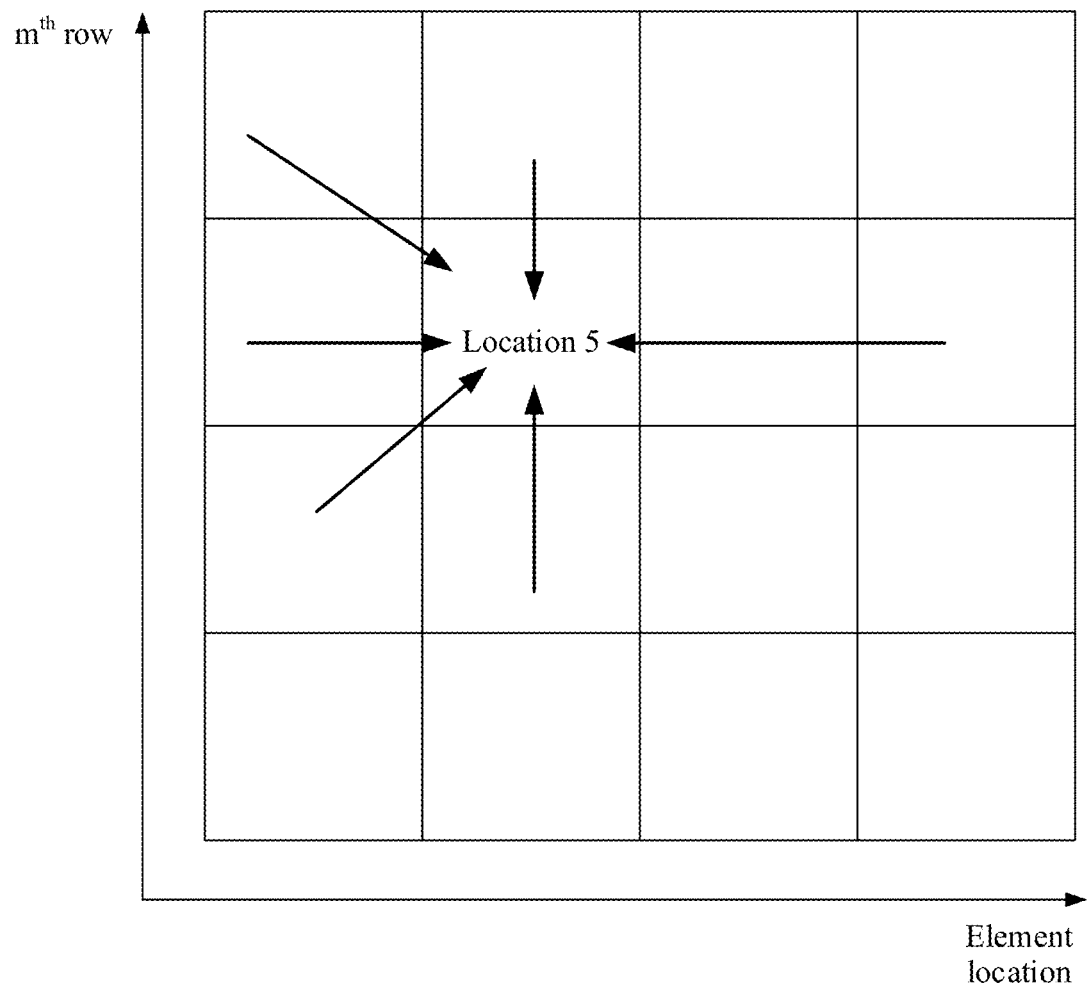
FIG. 10 is a schematic diagram of another reporting manner in which locations are normalized according to an embodiment of the present invention.

For another example, as shown in FIG. 10 (an example in which $K_{m,r}$ element locations selected for all rows are the same is used), the first indication information separately indicates corresponding element locations on 2L−1 rows, and indicates an element location $\gamma_r$ (a location 5 in the figure) with a maximum coefficient amplitude at $K_{m,r}$ element locations corresponding to all the 2L−1 rows, and a quantized value (shown by a solid line in the figure) of a normalized value that is of all or some coefficients at locations, other than $\gamma_r$, in the $K_{m,r}$ element locations $t_{r,m,l}, \ldots, t_{r,m,K_{m,r}}$ of all the rows and that is relative to a coefficient at the location $\gamma_r$. An advantage of the method is that: Feedback precision of a PMI of a beam with relatively strong energy can be higher.

Different quantization methods may be used to quantize relative values of coefficients.

In a possible implementation, quantities of quantization bits of at least two relative values in the relative values that are of the coefficients and that are included in the second indication information are different. For example, among all relative values that are of coefficients and that are included in the second indication information, sorting is performed based on amplitudes of the relative values, and a quantity of quantization bits used for relative values of P coefficients with maximum amplitude values is greater than a quantity of quantization bits used for relative values of other coefficients. The quantity of quantization bits herein used for comparison may be a quantity of quantization bits of amplitudes and/or a quantity of quantization bits of phases. An advantage of the method is that: When reporting overheads of a PMI are the same, quantization precision of a relative value of a coefficient with a relatively large amplitude is improved, and quantization precision of a relative value of a coefficient with a relatively small amplitude is reduced, so that overall feedback precision of the entire PMI can be improved.

Further, in a possible implementation, for an $m^{th}$ row and an $n^{th}$ row (m is not equal to n) of a matrix $V_{2,r}$, a reported quantity of quantization bits of a relative value of a coefficient at the $K_{m,r}$−1 element locations is greater than a quantity of quantization bits of a relative value of a coefficient at the $K_{n,r}$−1 element locations. The quantity of quantization bits herein used for comparison may be a quantity of quantization bits of amplitudes and/or a quantity of quantization bits of phases. An advantage of the method is that: When reporting overheads of a PMI are the same, quantization precision of a relative value of a coefficient corresponding to a vector with relatively strong energy in L vectors of $W_1$ is improved, and quantization precision of a relative value of a coefficient corresponding to a vector with relatively weak energy is reduced, so that overall feedback precision of the entire PMI can be improved.

Further, in another possible implementation, for a matrix $V_{2,r}$, quantities of quantization bits of at least two relative values in relative values of coefficients at locations, other than the third element location $\gamma_r$, in the element locations $$\bigcup_{m \in A} \{t_{r,m,1}, \ldots, t_{r,m,K_{m,r}}\}$$

are different. For example, the first communications apparatus may sort the relative values based on amplitudes of the relative values, and a quantity of quantization bits used for relative values of P coefficients with maximum amplitude values is greater than a quantity of quantization bits used for relative values of other coefficients. The quantity of quantization bits herein used for comparison may be a quantity of quantization bits of amplitudes and/or a quantity of quantization bits of phases. An advantage of the method is that: When reporting overheads of a PMI are the same, quantization precision of a relative value of a coefficient with a relatively large amplitude is improved, and quantization precision of a relative value of a coefficient with a relatively small amplitude is reduced, so that overall feedback precision of the entire PMI can be improved.

S402: The first communications apparatus sends the rank indicator RI and the precoding matrix indicator PMI.

S403: The second communications apparatus receives the rank indicator RI and the precoding matrix indicator PMI, and determines, based on the PMI, a precoding matrix $W_r = W_1 \times W_{2,r}$, on an $r^{th}$ (r=1, ..., R) layer in R layers.

In this embodiment of the present invention, the first communications apparatus includes, but is not limited to, a network device.

In this embodiment of the present invention, the second communications apparatus restores a time domain matrix $V_{2,r}$ on each layer based on the RI and the PMI that are reported by the first communications apparatus. The second communications apparatus determines R based on the RI. The second communications apparatus performs DFT transform on $V_{2,r}$, to obtain a frequency domain V2 matrix $W_{2,r}$ on each subband or RB. The W1 matrix is obtained with reference to the L vectors $b_{k_0}, \ldots, b_{k_{L-1}}$ reported by the first communications apparatus. In this case, a precoding matrix on an $f^{th}$ RB/subband is determined based on W1 and the matrix $W_{2,r}$. After the precoding matrix is obtained, when downlink data is sent, precoding processing is performed on the downlink data by using the precoding matrix.

Optionally, the method further includes: The second communications apparatus sends second configuration information; and the first communications device receives the second configuration information, where the second configuration information is used to indicate that: For an $m^{th}$ row, the location index information includes only one group of locations $C_{m,l}, \ldots, C_{m,K_m}$, and the group of locations $C_{m,1}, \ldots, C_{m,K_m}$ is used to indicate same $K_{m,r}$ element locations on the $m^{th}$ row of each of the R matrices $V_{2,l}, \ldots, V_{2,R}$. Alternatively, that the group of locations $C_{m,1}, \ldots, C_{m,K_m}$ is used to indicate same $K_{m,r}$ element locations on the $m^{th}$ row of each of the R matrices $V_{2,l}, \ldots, V_{2,R}$ may alternatively be specified in a protocol.

Optionally, the method further includes: The second communications apparatus sends third configuration information, and the first communications device receives the third configuration information, where the third configuration information is used to indicate that the location index information includes only R groups of locations, and an $r^{th}$ group of locations $C_{r,1}, \ldots, C_{r,K_r}$ is used to indicate same $K_{m,r}$ element locations on at least two rows in $V_{2,r}$. Alternatively, that an $r^{th}$ group of locations $C_{r,1}, \ldots, C_{r,K_r}$ is used to indicate same $K_{m,r}$ element locations of at least two rows in $V_{2,r}$ may alternatively be specified in a protocol.

During implementation of this embodiment of the present invention, when the precoding matrix index is reported, only some element locations and coefficient amplitudes and coefficient phases at some element locations may be reported, so that feedback overheads of the PMI can be reduced. When a plurality of element locations are reported, the locations may be reported in a location normalization manner, thereby further reducing feedback overheads of the PMI. When the coefficient amplitude and the coefficient phase are reported, reporting may be performed in a normalized manner, thereby further reducing feedback overheads of the PMI.

Figure 11:
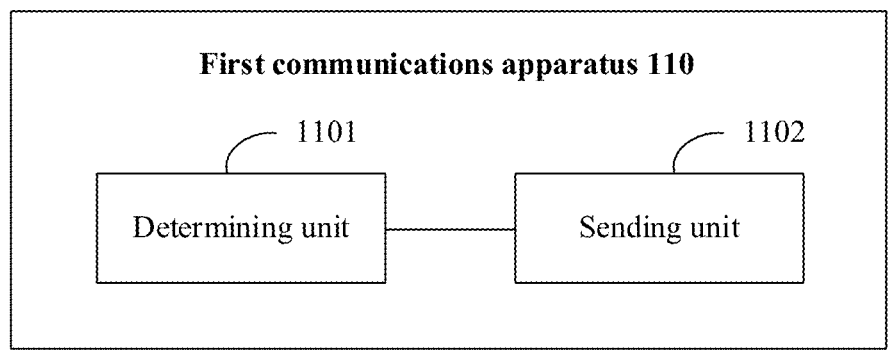
FIG. 11 is a structural block diagram of a first communications apparatus according to an embodiment of the present invention.

FIG. 11 is a structural block diagram of a first communications apparatus according to this application. As shown in FIG. 11, the first communications apparatus 110 may include a determining unit 1101 and a sending unit 1102.

The determining unit 1101 may be configured to determine a rank indicator RI and a precoding matrix indicator PMI. The PMI is used to determine R precoding matrices $W_1, \ldots, W_R$, and an $r^{th}$ precoding matrix in the R precoding matrices satisfies $W_r = W_1 \times W_{2,r}$, and $r \in \{1, \ldots, R\}$.

$W_1$ is a matrix of N rows and 2L columns, $W_{2,r}$ is a matrix of 2L rows and F columns, an $l^{th}$ row of $W_{2,r}$ is obtained by performing DFT transform on an $l^{th}$ row of a matrix $V_{2,r}$, $V_{2,r}$ is a matrix of 2L rows and T columns, R is indicated by the RI, and $l \in \{1, \ldots, 2L\}$ The PMI includes first indication information and second indication information, the first indication information includes location index information, the location index information is used to indicate $K_{m,r}$ element locations $t_{r,m,1}, \ldots, t_{r,m,K_{m,r}}$ on an $m^{th}$ row of $V_{2,r}$, the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, $V_{2,r}$ is determined based on the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$.

The RI is a nonnegative integer, N, L, F, T, and $K_{m,r}$ are all positive integers, $K_{m,r}$ is less than T, and F is less than or equal to T.

The sending unit 1102 may be configured to send the RI and the PMI.

Optionally, R>2, and for the $m^{th}$ row, the location index information indicates a group of locations $C_{m,1}, \ldots, C_{m,K_m}$, and the group of locations $C_{m,1}, \ldots, C_{m,K_m}$ is used to indicate the $K_{m,r}$ element locations on an $m^{th}$ row of each of the R matrices $V_{2,1}, \ldots, V_{2,R}$, that is, $t_{r,m,i} = C_{m,i}$ and $m \in \{1, \ldots, 2L\}$, and $i \in \{1, \ldots, K_m\}$.

Optionally, R≥1, the location index information indicates R groups of locations, an $r^{th}$ group of locations $C_{r,1}, \ldots, C_{r,K_r}$ in the R groups of locations is used to indicate the $K_{m,r}$ element locations on at least two rows in $V_{2,r}$, that is $n \in \{1, \ldots, 2L\}$, $m \in \{1, \ldots, 2L\}$, and $n \neq m$ and it satisfies that $t_{r,m,i} = t_{r,n,i} = C_{r,i}$, $K_{m,r} = K_{n,r} = K_r$, $i \in \{1, \ldots, K_{m,r}\}$, and $r \in \{1, \ldots, R\}$.

Optionally, the location index information includes indication information of $M_m$ reference locations, the indication information of the $M_m$ reference locations is used to indicate the $r^{th}$ group of locations $C_{m,1}, \ldots, C_{m,K_m}$, and $M_m$ is a positive integer less than T.

Optionally, the location index information includes indication information of $M_r$ reference locations, the indication information of the $M_r$ reference locations is used to indicate the $r^{th}$ group of locations $C_{r,1}, \ldots, C_{r,K_r}$ in the R groups of locations, and $M_r$ is a positive integer less than T.

Optionally, for the $m^{th}$ row, the location index information further includes a window size $X_{m,n}$ associated with an $n^{th}$ ($n=1, \ldots, M_m$) reference location in the $M_m$ reference locations, the $M_m$ reference locations and the $M_m$ window sizes are used to determine the group of locations $C_{m,1}, \ldots, C_{m,K_m}$, and $X_{m,n}$ is a positive integer.

Alternatively, a window size $X_{m,n}$ associated with an $n^{th}$ ($n=1, \ldots, M_m$) reference location in the $M_m$ reference locations is configured by using first configuration information, the $M_m$ reference locations and the $M_m$ window sizes are used to determine the group of locations $C_{m,1}, \ldots, C_{m,K_m}$ is a positive integer.

Optionally, the location index information further includes a window size $X_{r,n}$ associated with an $n^{th}$ ($n=1, \ldots, M_r$) reference location in the $M_r$ reference locations, the $M_r$ reference locations and the $M_r$ window sizes are used to determine the $r^{th}$ group of locations $C_{r,1}, \ldots, C_{r,K_r}$ groups of locations, and $X_{r,n}$ is a positive integer.

Alternatively, a window size $X_{r,n}$ associated with an $n^{th}$ ($n=1, \ldots, M_r$) reference location in the $M_r$ reference locations is configured by using first configuration information, the $M_r$ reference locations and the $M_r$ window sizes are used to determine the $r^{th}$ group of locations $C_{r,1}, \ldots, C_{r,K_r}$ r in the R groups of locations, and $X_{r,n}$ is a positive integer.

Optionally, when a quantity $G_m$ of the reference locations is greater than 1, the location index information includes absolute location information of one first reference location in the $G_{m,r}$ reference locations, and relative location information that is of each of $G_{m,r}-1$ reference locations, other than the first reference location, in the $G_{m,r}$ reference locations and that is relative to the first reference location, where $G_{m,r} = M_m$ or $G_{m,r} = M_r$.

Optionally, when $G_{m,r} = M_m$, the location index information further includes $G_m$ groups of fourth indication information, and an $n^{th}$ ($1 \leq n \leq G_m$) group of fourth indication information is used to indicate $Z_{m,n}$ element locations selected from $Y_{m,n}$ element locations. The $Y_{m,n}$ element locations are determined based on an $n^{th}$ reference location in the $G_m$ reference locations and a window size $X_{m,n}$ associated with the $n^{th}$ reference location, $Z_{m,n}$ is a positive integer less than or equal to $Y_{m,n}$, and the $G_m$ reference locations, the $G_m$ window sizes, and the $G_m$ pieces of fourth indication information are used to determine the group of locations $C_{m,1}, \ldots, C_{m,K_m}$.

Alternatively, when $G_{m,r} = M_r$, the location index information further includes $G_r$ group of fourth indication information, and an $n^{th}$ ($1 \leq n \leq G_r$) group of fourth indication information is used to indicate $Z_{r,n}$ element locations selected from $Y_{r,n}$ element locations. The $Y_{r,n}$ element locations are determined based on an $n^{th}$ reference location in the $G_r$ reference locations and a window size $X_{r,n}$ associated with the $n^{th}$ reference location, $Z_{r,n}$ is a positive integer less than or equal to $Y_{r,n}$, and the $G_r$ reference locations, the $G_r$ window sizes, and the $G_r$ pieces of fourth indication information are used to determine the $r^{th}$ group of locations $C_{m,1}, \ldots, C_{m,K_m}$ in the R groups of locations.

Optionally, the first indication information further includes indication information of |A| first element locations $\tau_{r,m}$ and one second element location $\gamma_r$ of $V_{2,r}$, $m \in A$, the set A is a non-empty subset of a set $\{1, \ldots, 2L\}$, |A| represents a quantity of elements in the set A, and $r \in \{1, \ldots, R\}$.

$\tau_{r,m}$ is an element location with a maximum coefficient amplitude $|a_{r,m,t_{r,m,j}}|$ in the $K_{m,r}$ element locations $t_{r,m,l}, \ldots, t_{r,m,K_{m,r}}$, and the second element location $\gamma_r$ is an element location with a maximum coefficient amplitude $|a_{r,m,\tau_{r,m}}|$ in the $|A|$ first element locations $\tau_{r,m}$.

The second indication information includes relative values of all or some coefficients $a_{r,m,t_{r,m,j}}$ at $K_{m,r}-1$ element locations, other than the first element location $\tau_{r,m}$, the $K_{m,r}$ element locations $t_{r,m,l}, \ldots, t_{r,m,K_{m,r}}$ and a coefficient $a_{r,m,\tau_{r,m}}$ at the first element location $\tau_{r,m}$.

The second indication information further includes relative values of coefficients $a_{r,m,\tau_{r,m}}$ at $|A|-1$ first element locations, other than the second element location $\gamma_r$, in the $|A|$ first element locations $\tau_{r,m}$ and a coefficient $a_{r,m,\gamma_r}$ at the second element location $\gamma_r$.

Optionally, the first indication information includes a third element location $\gamma_r$ of $V_{2,r}$, and $\gamma_r$ is used to indicate an element location with a maximum coefficient amplitude $|a_{r,m,t_{r,m,j}}|$ at element locations $$\bigcup_{m \in A} \{t_{r,m,1}, \ldots, t_{r,m,K_{m,r}}\}.$$

The second indication information includes relative values of all or some coefficients at element locations, other than the third element location $\gamma_r$, in all the element locations $$\bigcup_{m \in A} \{t_{r,m,1}, \ldots, t_{r,m,K_{m,r}}\}$$

and a coefficient at the location $\gamma_r$.

$$\bigcup_{m \in A} \{t_{r,m,1}, \ldots, t_{r,m,K_{m,r}}\}$$

is a set obtained by obtaining a union set of sets $\{t_{r,m,l}, \ldots, t_{r,m,K_{m,r}}\}$ corresponding to all elements m that belong to the set A.

Optionally, quantities of quantization bits of at least two relative values in the relative values that are of the coefficients and that are included in the second indication information are different.

Optionally, $$W_1 = \begin{bmatrix} X & 0 \\ 0 & X \end{bmatrix}$$

is a matrix of N rows and 2L columns, and $X=[b_{k_0} \ldots b_{k_{L-1}}]$ is a matrix of N/2 rows and L columns, $b_{k_i}$ ($0 \le i \le L-1$) belongs to a vector set $B=\{b_0, b_1, \ldots b_{M-1}\}$, the PMI further includes third indication information, the third indication information is used to indicate the L vectors $b_{k_0}, \ldots, b_{k_{L-1}}$, M is a positive integer, and M is greater than or equal to L.

Optionally, $V_{2,r}=[V_{2,r,l} \ldots V_{2,r,T}]$, a $t^{th}$ column in $V_{2,r}$ is $V_{2,r,t}=[a_{r,l,t} \ldots a_{r,2L,t}]^T$, $1 \le t \le T$, and $[\ ]^T$ represents transposing.

It may be understood that, for a specific implementation of the functional units included in the first communications apparatus 110, refer to the foregoing embodiment. Details are not described herein again.

Figure 12:
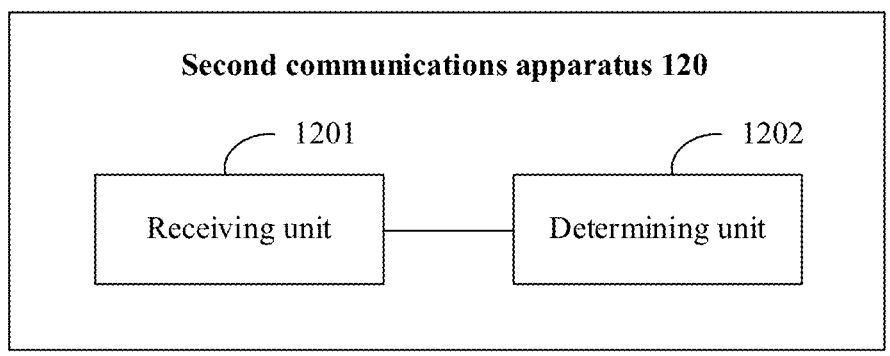
FIG. 12 is a structural block diagram of a second communications apparatus according to an embodiment of the present invention.

FIG. 12 is a structural block diagram of a second communications apparatus according to this application. As shown in FIG. 12, the second communications apparatus 120 may include a receiving unit 1201 and a determining unit 1202.

The receiving unit 1201 is configured to receive a rank indicator RI and a precoding matrix indicator PMI.

The determining unit 1202 is configured to determine R precoding matrices $W_1, \ldots, W_R$ based on the PMI, and an $r^{th}$ precoding matrix in the R precoding matrices satisfies $W_r=W_1 \times W_{2,r}$, and $r \in \{1, \ldots, R\}$.

$W_1$ is a matrix of N rows and 2L columns, $W_{2,r}$ is a matrix of 2L rows and F columns, an $l^{th}$ row of $W_{2,r}$ is obtained by performing DFT transform on an $l^{th}$ row of a matrix $V_{2,r}$, $V_{2,r}$ is a matrix of 2L rows and T columns, R is indicated by the RI, and $l \in \{1, \ldots, 2L\}$.

The PMI includes first indication information and second indication information, the first indication information includes location index information, and the location index information is used to indicate $K_{m,r}$ element locations $t_{r,m,l}, \ldots, t_{r,m,K_{m,r}} \in \{1, \ldots, T\}$ on an $m^{th}$ row of $V_{2,r}$, the second indication information is used to indicate $K_{m,r}$ complex coefficients $a_{r,m,t_{r,m,j}}$ at the element locations $t_{r,m,l}, \ldots, t_{r,m,K_{m,r}}$ on the $m^{th}$ row of $V_{2,r}$, $V_{2,r}$ is determined based on the $K_{m,r}$ element locations and the $K_{m,r}$ complex coefficients $a_{r,m,t_{r,m,j}}$, $m \in \{1, \ldots, 2L\}$, and $i \in \{1, \ldots, K_{m,r}\}$.

The RI is a nonnegative integer, N, L, F, T, R, and $K_{m,r}$ are all positive integers, $K_{m,r}$ is less than T, and F is less than or equal to T.

Optionally, $R \ge 2$, and for the $m^{th}$ row, the location index information indicates a group of locations $C_{m,l}, \ldots, C_{m,K_m}$, and the group of locations $C_{m,l}, \ldots, C_{m,K_m}$ is used to indicate the $K_{m,r}$ element locations on an $m^{th}$ row of each of the R matrices $V_{2,l}, \ldots, V_{2,R}$, that is $t_{r,m,i}=C_{m,i}$ and $K_{m,r}=K_m$, $m \in \{1, \ldots, 2L\}$, and $i \in \{1, \ldots, K_{m,r}\}$.

Optionally, $R \ge 1$, the location index information indicates R groups of locations, an $r^{th}$ group of locations $C_{m,l}, \ldots, C_{m,K_m}$ in the R groups of locations is used to indicate the $K_{m,r}$ element locations on at least two rows in $V_{2,r}$, that is, $n \in \{1, \ldots, 2L\}$, $m \in \{1, \ldots, 2L\}$, and $n \ne m$, and it satisfies that $t_{r,m,i}=t_{r,n,i}=c_{r,i}$, $K_{m,r}=K_{n,r}=K_r$, $i \in \{1, \ldots, K_{m,r}\}$, and $r \in \{1, \ldots, R\}$.

Optionally, the location index information includes indication information of $M_m$ reference locations, the indication information of the $M_m$ reference locations is used to indicate the group of locations $C_{m,l}, \ldots, C_{m,K_m}$, and $M_m$ is a positive integer less than T.

Optionally, the location index information includes indication information of $M_r$ reference locations, the indication information of the $M_r$ reference locations is used to indicate the $r^{th}$ group of locations $C_{r,l}, \ldots, C_{r,K_r}$ in the R groups of locations, and $M_r$ is a positive integer less than T.

Optionally, for the $m^{th}$ row, the location index information further includes a window size $X_{m,n}$ associated with an $n^{th}$ (n=1, \ldots, M_m) reference location in the $M_m$ reference locations, the $M_m$ reference locations and the $M_m$ window sizes are used to determine the group of locations $C_{m,l}, \ldots, C_{m,K_m}$, and $X_{m,n}$ is a positive integer.

Alternatively, a window size $X_{m,n}$ associated with an $n^{th}$ (n=1, \ldots, M_m) reference location in the $M_m$ reference locations is configured by using first configuration information, the $M_m$ reference locations and the $M_m$ window sizes are used to determine the group of locations $C_{m,l}, \ldots, C_{m,K_m}$, and $X_{m,n}$ is a positive integer.

Optionally, the location index information further includes a window size $X_{r,n}$ associated with an $n^{th}$ (n=1, \ldots, M_r) reference location in the $M_r$ reference locations, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer.

Alternatively, a window size $X_{r,n}$ associated with an $n^{th}$ ($n=1, \ldots, M_r$) reference location in the $M_r$ reference locations is configured by using first configuration information, the $M_r$ reference locations and the $M_r$ window sizes are used to determine the $r^{th}$ group of locations in the R groups of locations, and $X_{r,n}$ is a positive integer.

Optionally, when a quantity $G_m$ of the reference locations is greater than 1, the location index information includes absolute location information of one first reference location in the $G_{m,r}$ reference locations, and relative location information that is of each of $G_{m,r}-1$ reference locations, other than the first reference location, in the $G_{m,r}$ reference locations and that is relative to the first reference location, where $G_{m,r}=M_m$ or $G_{m,r}=M_r$.

Optionally, when $G_{m,r}=M_m$, the location index information further includes $G_m$ groups of fourth indication information, and an $n^{th}$ ($1 \le n \le G_m$) group of fourth indication information is used to indicate $Z_{m,n}$ element locations selected from $Y_{m,n}$ element locations. The $Y_{m,n}$ element locations are determined based on an $n^{th}$ reference location in the $G_m$ reference locations and a window size $X_{m,n}$ associated with the $n^{th}$ reference location, $Z_{m,n}$ is a positive integer less than or equal to $Y_{m,n}$, and the $G_m$ reference locations, the $G_m$ window sizes, and the $G_m$ pieces of fourth indication information are used to determine the group of locations $C_{m,1}, \ldots, C_{m,K_m}$.

Alternatively, when $G_{m,r}=M_r$, the location index information further includes $G_r$ group of fourth indication information, and an $n^{th}$ ($1 \le n \le G_r$) group of fourth indication information is used to indicate $Z_{r,n}$ element locations selected from $Y_{r,n}$ element locations. The $Y_{r,n}$ element locations are determined based on an $n^{th}$ reference location in the $G_r$ reference locations and a window size $X_{r,n}$ associated with the $n^{th}$ reference location, $Z_{r,n}$ is a positive integer less than or equal to $Y_{r,n}$, and the $G_r$ reference locations, the $G_r$ window sizes, and the $G_r$ pieces of fourth indication information are used to determine the $r^{th}$ group of locations $C_{m,1}, \ldots, C_{m,K_m}$ in the R groups of locations.

Optionally, the first indication information further includes indication information of $|A|$ first element locations $\tau_{r,m}$ and one second element location $\gamma_r$ of $V_{2,r}$, $m \in A$, the set $A$ is a non-empty subset of a set $\{1, \ldots, 2L\}$, $|A|$ represents a quantity of elements in the set A, and $r \in \{1, \ldots, R\}$.

$\tau_{r,m}$ is an element location with a maximum coefficient amplitude $|a_{r,m,t_{r,m,j}}|$ in the $K_{m,r}$ element locations $t_{r,m,1}, \ldots, t_{r,m,K_{m,r}}$, and the second element location $\gamma_r$ is an element location with a maximum coefficient amplitude $|a_{r,m,\tau_{r,m}}|$ in the $|A|$ first element locations $\tau_{r,m}$.

The second indication information includes relative values of all or some coefficients $a_{r,m,t_{r,m,j}}$ at $K_{m,r}-1$ element locations, other than the first element location $\tau_{r,m}$, in the $K_{m,r}$ element locations $t_{r,m,1}, \ldots, t_{r,m,K_{m,r}}$ and a coefficient $a_{r,m,\tau_{r,m}}$ at the first element location $\tau_{r,m}$.

The second indication information further includes relative values of coefficients $a_{r,m,\tau_{r,m}}$ $|A|-1$ element locations, other than the second element location $\gamma_r$, in the $|A|$ first element locations $\tau_{r,m}$ and a coefficient $a_{r,m,y_r}$ at the second element location $\gamma_r$.

Optionally, the first indication information includes a third element location $\gamma_r$ of $V_{2,r}$, and $\gamma_r$ is used to indicate an element location with a maximum coefficient amplitude $|a_{r,m,t_{r,m,j}}|$ at element locations $$\bigcup_{m \in A} \{t_{r,m,1}, \ldots, t_{r,m,K_{m,r}}\}.$$

The second indication information includes relative values of all or some coefficients at element locations, other than the third element location $\gamma_r$, in the element locations $$\bigcup_{m \in A} \{t_{r,m,1}, \ldots, t_{r,m,K_{m,r}}\}$$

and a coefficient at the location $\gamma_r$.

$$\bigcup_{m \in A} \{t_{r,m,1}, \ldots, t_{r,m,K_{m,r}}\}$$

is a set obtained by obtaining a union set of sets $\{t_{r,m,1}, \ldots, t_{r,m,K_{m,r}}\}$ corresponding to all elements m that belong to the set A.

Optionally, quantities of quantization bits of at least two relative values in the relative values that are of the coefficients and that are included in the second indication information are different.

Optionally, $$W_1 = \begin{bmatrix} X & 0 \\ 0 & X \end{bmatrix}$$

is a matrix of N rows and 2L columns, and $X=[b_{k_0} \ldots b_{k_{L-1}}]$ is a matrix of N/2 rows and L columns, $b_{k_i}$ ($0 \le i \le L-1$) belongs to a vector set $B=\{b_0, b_1, \ldots, b_{M-1}\}$, the PMI further includes third indication information, the third indication information is used to indicate the L vectors $b_{k_0}, \ldots, b_{k_{L-1}}$, M is a positive integer, and M is greater than or equal to L.

Optionally $V_{r,r}=[V_{2,r,1} \ldots V_{2,r,T}]$, a $t^{th}$ column in $V_{2,r}$ is $V_{2,r,t}=[a_{r,1,t} \ldots a_{r,2,L,t}]^T$, $1 \le t \le T$, and $[\ ]^T$ represents transposing.

It may be understood that, for a specific implementation of the functional units included in the second communications apparatus 120, refer to the foregoing embodiment. Details are not described herein again.

Methods or algorithm steps described in combination with the content disclosed in the embodiments of the present invention may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a transceiver or a relay device.

Certainly, the processor and the storage medium may exist in a network device or a terminal device as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in a computer-readable medium. The computer-readable medium includes a computer storage medium and a communications medium, and the communications medium includes any medium that enables a computer program to be transmitted from one place to another. The storage medium may be any available medium accessible to a general-purpose or special-purpose computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A precoding matrix indicator (PMI) reporting method, comprising:

determining, by a first communications apparatus, a rank indicator (RI) and a PMI, wherein the PMI is used to determine R precoding matrices $W_1, \ldots, W_R$, and an $r^{th}$ precoding matrix $W_r$ in the R precoding matrices satisfies $W_r = W_1 \times W_{2,r}$, and $r \in \{1, \ldots, R\}$;

$W_1$ is a matrix of N rows and 2L columns, $W_{2,r}$ is a matrix of 2L rows and F columns, an $l^{th}$ row of $W_{2,r}$ is obtained by performing Discrete Fourier Transform (DFT) on an $l^{th}$ row of a matrix $V_{2,r}$, $V_{2,r}$ is a matrix of 2L rows and T columns, R is indicated by the RI, and $l \in \{1, \ldots, 2L\}$;

the PMI comprises first indication information and second indication information, the first indication information comprises location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, wherein $V_{2,r}$ is determined based on the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$; and R is a nonnegative integer, N, L, F, T, and $K_{m,r}$ are all positive integers, $K_{m,r}$ is less than T, and F is less than or equal to T; and sending, by the first communications apparatus, the RI and the PMI.

2. The method according to claim 1, wherein $R \geq 1$, and the location index information indicates R groups of locations, wherein an $r^{th}$ group of locations $C_{r,1}, \ldots, C_{r,K_r}$ in the R groups of locations is used to indicate the $K_{m,r}$ element locations on at least two rows in $V_{2,r}$, that is, $n \in \{1, \ldots, 2L\}$, $m \in \{1, \ldots, 2L\}$, and $n \neq m$, and it satisfies that $t_{r,m,i} = t_{r,n,j} = c_{r,j}$, $K_{m,r} = K_{n,r} K_r$, $i \in \{1, \ldots, K_{m,r}\}$, and $r \in \{1, \ldots, R\}$.

3. The method according to claim 2, wherein the location index information comprises indication information of $M_r$ reference locations, the indication information of the $M_r$ reference locations is used to indicate the $r^{th}$ group of locations $C_{r,1}, \ldots, C_{r,K_r}$ in the R groups of locations, and $M_r$ is a positive integer less than T.

4. The method according to claim 3, wherein
the location index information further comprises a window size $X_{r,n}$ associated with an $n^{th}$ ($n=1, \ldots, M_r$) reference location in the $M_r$ reference locations, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer; or
a window size $X_{r,n}$ associated with an $n^{th}$ ($n=1, \ldots, M_r$) reference location in the $M_r$ reference locations is configured by using first configuration information, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer.

5. The method according to claim 3, wherein when a quantity $G_{m,r}$ of the reference locations is greater than 1, the location index information comprises absolute location information of one first reference location in the $G_{m,r}$ reference locations, and relative location information that is of each of $G_{m,r}-1$ reference locations, other than the first reference location, in the $G_{m,r}$ reference locations and that is relative to the first reference location, wherein $G_{m,r} = M_m$ or $G_{m,r} = M_r$.

6. The method according to claim 5, wherein when $G_{m,r} = M_m$, the location index information further comprises $G_m$ groups of fourth indication information, and an $n^{th}$ ($1 \leq n \leq G_m$) group of fourth indication information is used to indicate $Z_{m,n}$ element locations selected from $Y_{m,n}$ element locations, wherein the $Y_{m,n}$ element locations are determined based on an $n^{th}$ reference location in the $G_m$ reference locations and a window size $X_{m,n}$ associated with the $n^{th}$ reference location, $Z_{m,n}$ is a positive integer less than or equal to $Y_{m,n}$, and the $G_m$ reference locations, the $G_m$ window sizes, and the $G_m$ pieces of fourth indication information are used to determine the group of locations $C_{m,1}, \ldots, C_{m,K_m}$; or
when $G_{m,r} = M_r$, the location index information further comprises $G_r$ groups of fourth indication information, and an $n^{th}$ ($1 \leq n \leq G_r$) group of fourth indication information is used to indicate $Z_{r,n}$ element locations selected from $Y_{r,n}$ element locations, wherein the $Y_{r,n}$ element locations are determined based on an $n^{th}$ reference location in the $G_r$ reference locations and a window size $X_{r,n}$ associated with the $n^{th}$ reference location, $Z_{r,n}$ is a positive integer less than or equal to $Y_{r,n}$, and the $G_r$ reference locations, the $G_r$ window sizes, and the $G_r$ pieces of fourth indication information are used to determine the $r^{th}$ group of locations $C_{r,1}, \ldots, C_{r,K_r}$ in the R groups of locations.

7. A precoding matrix indicator (PMI) receiving method, comprising:

receiving, by a second communications apparatus, a rank indicator (RI) and a PMI; and determining, by the second communications apparatus, R precoding matrices $W_1, \ldots, W_R$ based on the PMI, wherein an $r^{th}$ precoding matrix $W_r$ in the R precoding matrices satisfies $W_r = W_1 \times W_{2,r}$, and $r \in \{1, \ldots, R\}$;

$W_1$ is a matrix of N rows and 2L columns, $W_{2,r}$ is a matrix of 2L rows and F columns, an $i^{th}$ row of $W_{2,r}$ is obtained by performing Discrete Fourier Transform (DFT) on an $l^{th}$ row of a matrix $V_{2,r}$, $V_{2,r}$ is a matrix of 2L rows and T columns, R is indicated by the RI, and $l \in \{1, \ldots, 2L\}$;

the PMI comprises first indication information and second indication information, the first indication information comprises location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,j}}$ at the element locations $t_{r,m,1}, \ldots, t_{r,m,K_{m,r}}$ on the $m^{th}$ row of $V_{2,r}$, wherein $V_{2,r}$ is determined based on the $K_{m,r}$ element locations and the $K_{m,r}$ complex coefficients $a_{r,m,t_{r,m,j}}$, $m \in \{1, \ldots, 2L\}$, and $i \in \{1, \ldots, K_{m,r}\}$; and the RI is a nonnegative integer, N, L, F, T, R, and $K_{m,r}$ are all positive integers, $K_{m,r}$ is less than T, and F is less than or equal to T.

8. The method according to claim 7, wherein R≥1, and the location index information indicates R groups of locations, wherein an $r^{th}$ group of locations $C_{r,1}, \ldots, C_{r,K_r}$ in the R groups of locations is used to indicate the $K_{m,r}$ element locations on at least two rows in $V_{2,r}$, that is, $n \in \{1, \ldots, 2L\}$, $m \in \{1, \ldots, 2L\}$, and $n \neq m$, and it satisfies that $t_{r,m,j} = t_{r,n,i} = c_{r,i}$, $K_{m,r} = K_{n,r} = K_r$, $\in \{1, \ldots, K_{m,r}\}$ and $r \in \{1, \ldots, R\}$.

9. The method according to claim 8, wherein the location index information comprises indication information of $M_r$ reference locations, the indication information of the $M_r$ reference locations is used to indicate the $r^{th}$ group of locations $C_{r,1}, \ldots, C_{r,K_r}$ in the R groups of locations, and $M_r$ is a positive integer less than T.

10. The method according to claim 9, wherein
the location index information further comprises a window size $X_{r,n}$ associated with an $n^{th}$ (n=1, ..., $M_r$) reference location in the $M_r$ reference locations, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer; or
a window size $X_{r,n}$ associated with an $n^{th}$ (n=1, ..., $M_r$) reference location in the $M_r$ reference locations is configured by using first configuration information, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer.

11. A communications apparatus, comprising at least one processor, a transmitter, and a non-transitory computer-readable storage medium coupled to the at least one processor and storing programming instructions for execution by the at least one processor, the programming instructions instruct the at least one processor to:
determine a rank indicator (RI) and a precoding matrix indicator (PMI), wherein the PMI is used to determine R precoding matrices $W_1, \ldots, W_R$, and an $r^{th}$ precoding matrix in the R precoding matrices satisfies $W_r = W_1 \times W_{2,r}$, and $r \in \{1, \ldots, R\}$;
$W_1$ is a matrix of N rows and 2L columns, $W_{2,r}$ is a matrix of 2L rows and F columns, $l^{th}$ an row of $W_{2,r}$ is obtained by performing Discrete Fourier Transform (DFT) on an $l^{th}$ row of a matrix $V_{2,r}$, $V_{2,r}$ is a matrix of 2L rows and T columns, R is indicated by the RI, and $l \in \{1, \ldots, 2L\}$;
the PMI comprises first indication information and second indication information, the first indication information comprises location index information, the location index information is used to indicate $K_{m,r}$ element locations on an $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,j}}$ at the element locations $t_{r,m,1}, \ldots, t_{r,m,K_{m,r}}$ on the $m^{th}$ row of $V_{2,r}$, wherein $V_{2,r}$ is determined based on the $K_{m,r}$ element locations and the $K_{m,r}$ complex coefficients $a_{r,m,t_{r,m,j}}$, $m \in \{1, \ldots, 2L\}$, and $i \in \{1, \ldots, K_{m,r}\}$; and
the RI is a nonnegative integer, N, L, F, T, and $K_{m,r}$ are all positive integers, $K_{m,r}$ is less than T, and F is less than or equal to T; and
casue the transmitter to send the RI and the PMI.

12. The apparatus according to claim 11, wherein R≥1, and the location index information indicates R groups of locations, wherein an $r^{th}$ group of locations $C_{r,1}, \ldots, C_{r,K_r}$ in the R groups of locations is used to indicate the $K_{m,r}$ element locations on at least two rows in $V_{2,r}$, that is $n \in \{1, \ldots, 2L\}$, $m \in \{1, \ldots, 2L\}$, and $n \neq m$, and it satisfies that $t_{r,m,j} = t_{r,n,i} = c_{r,i}$, $K_{m,r} = K_{n,r} = K_r$, $i \in \{1, \ldots, K_{m,r}\}$, and $r \in \{1, \ldots, R\}$.

13. The apparatus according to claim 12, wherein the location index information comprises indication information of $M_r$ reference locations, the indication information of the $M_r$ reference locations is used to indicate the $r^{th}$ group of locations $C_{r,1}, \ldots, C_{r,K_r}$ in the R groups of locations, and $M_r$ is a positive integer less than T.

14. The apparatus according to claim 13, wherein
the location index information further comprises a window size $X_{r,n}$ associated with an $n^{th}$ (n=1, ..., $M_r$) reference location in the $M_r$ reference locations, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer; or
a window size $X_{r,n}$ associated with an $n^{th}$ (n=1, ..., $M_r$) reference location in the $M_r$ reference locations is configured by using first configuration information, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer.

15. The apparatus according to claim 13, wherein when a quantity $G_{m,r}$ of the reference locations is greater than 1, the location index information comprises absolute location information of one first reference location in the $G_{m,r}$ reference locations, and relative location information that is of each of $G_{m,r}-1$ reference locations, other than the first reference location, in the $G_{m,r}$ reference locations and that is relative to the first reference location, wherein $G_{m,r} = M_m$ or $G_{m,r} = M_r$.

16. The apparatus according to claim 15, wherein when $G_{m,r} = M_m$, the location index information further comprises $G_m$ groups of fourth indication information, and an $n^{th}$ (1≤n≤$G_m$) group of fourth indication information is used to indicate $Z_{m,n}$ element locations selected from $Y_{m,n}$ element locations, wherein the $Y_{m,n}$ element locations are determined based on an $n^{th}$ reference location in the $G_m$ reference locations and a window size $X_{m,n}$ associated with the $n^{th}$ reference location, $Z_{m,n}$ is a positive integer less than or equal to $Y_{m,n}$, and the $G_m$ reference locations, the $G_m$ window sizes, and the $G_m$ pieces of fourth indication information are used to determine the group of locations $C_{m,1}, \ldots, C_{m,K_m}$; or
when $G_{m,r} = M_r$, the location index information further comprises $G_r$ groups of fourth indication information, and an $n^{th}$ (1≤n≤$G_r$) group of fourth indication information is used to indicate $Z_{r,n}$ element locations selected from $Y_{r,n}$ element locations, wherein the $Y_{r,n}$ element locations are determined based on an $n^{th}$ reference location in the $G_r$ reference locations and a window size $X_{r,n}$ associated with the $n^{th}$ reference location, $Z_{r,n}$ is a positive integer less than or equal to $Y_{r,n}$, and the $G_r$ reference locations, the $G_r$ window sizes, and the $G_r$ pieces of fourth indication information are used to determine the $r^{th}$ group of locations $C_{r,1}, \ldots, C_{r,K_r}$ in the R groups of locations.

17. A communications apparatus, comprising at least one processor, a receiver, and a non-transitory computer-readable storage medium coupled to the at least one processor and storing programming instructions for execution by the at least one processor, the programming instructions instruct the at least one processor to:
  cause the receiver to receive a rank indicator (RI) and a precoding matrix indicator (PMI); and
  determine R precoding matrices $W_1, \ldots, W_R$ based on the PMI, wherein an $r^{th}$ precoding matrix in the R precoding matrices satisfies $W_r = W_1 \times W_{2,r}$, and $r \in \{1, \ldots, R\}$; $W_1$ is a matrix of N rows and 2L columns, $W_{2,r}$ is a matrix of 2L rows and F columns, an $l^{th}$ row of $W_{2,r}$ is obtained by performing Discrete Fourier Transform (DFT) on an $l^{th}$ row of a matrix $V_{2,r}$, $V_{2,r}$ is a matrix of 2L rows and T columns, R is indicated by the RI, and $l \in \{1, \ldots, 2L\}$;
  the PMI comprises first indication information and second indication information, the first indication information comprises location index information, the location index information is used to indicate $K_{m,r}$ element locations $t_{r,m,1}, \ldots, t_{r,m,K_{m,r}} \in \{1, \ldots, T\}$ on an $m^{th}$ row of $V_{2,r}$, and the second indication information is used to indicate $K_{m,r}$ complex coefficients $a_{r,m,t_{r,m,i}}$ at the element locations $t_{r,m,1}, \ldots, t_{r,m,K_{m,r}}$ on the $m^{th}$ row of $V_{2,r}$, wherein $V_{2,r}$ is determined based on the $K_{m,r}$ element locations and the $K_{m,r}$ complex coefficients $a_{r,m,t_{r,m,i}}$, $m \in \{1, \ldots, 2L\}$, and $i \in \{1, \ldots, K_{m,r}\}$; and the RI is a nonnegative integer, N, L, F, T, R, and $K_{m,r}$ are all positive integers, $K_{m,r}$ is less than T, and F is less than or equal to T.

18. The apparatus according to claim 17, wherein $R \geq 1$, and the location index information indicates R groups of locations, wherein an $r^{th}$ group of locations $C_{r,1}, \ldots, C_{r,K_r}$ in the R groups of locations is used to indicate the $K_{m,r}$ element locations on at least two rows in $V_{2,r}$, that is, $n \in \{1, \ldots, 2L\}$, $m \in \{1, \ldots, 2L\}$, and $n \neq m$, and it satisfies that $t_{r,m,i} = t_{r,n,i} = C_{r,i}$, $K_{m,r} = K_{n,r} = K_r$, $i \in \{1, \ldots, K_{m,r}\}$, and $r \in \{1, \ldots, R\}$.

19. The apparatus according to claim 18, wherein the location index information comprises indication information of $M_r$ reference locations, the indication information of the $M_r$ reference locations is used to indicate the $r^{th}$ group of locations $C_{r,1}, \ldots, C_{r,K_r}$ in the R groups of locations, and $M_r$ is a positive integer less than T.

20. The apparatus according to claim 19, wherein
  the location index information further comprises a window size $X_{r,n}$ associated with an $n^{th}$ ($n=1, \ldots, M_r$) reference location in the $M_r$ reference locations, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer; or
  a window size $X_{r,n}$ associated with an $n^{th}$ ($n=1, \ldots, M_r$) reference location in the $M_r$ reference locations is configured by using first configuration information, the $M_r$ reference locations and the $M_r$ window sizes are used to determine the $r^{th}$ group of locations $C_{r,1}, \ldots, C_{r,K_r}$ in the R groups of locations, and $X_{r,n}$ is a positive integer.

* * * * *

UNITED STATES PATENT AND TRADEMARK OFFICE
CERTIFICATE OF CORRECTION

PATENT NO. : 10,965,355 B2
APPLICATION NO. : 16/935549
DATED : March 30, 2021
INVENTOR(S) : Xueru Li et al.

It is certified that error appears in the above-identified patent and that said Letters Patent is hereby corrected as shown below:

On the Title Page

In item (57), in Column 2, in "Abstract", Lines 6-7, delete "$W_r \times W_1 \times W_{2,r}$," and insert -- $W_r = W_1 x W_{2,r}$, --.

In item (57), in Column 2, in "Abstract", Line 8, delete "$V_{2,r}$and" and insert -- $V_{2,r}$, and --.

In the Claims

In Column 37, Line 64, in Claim 2, delete "$t_{r,n,j} = c_{r,j}$," and insert -- $t_{r,n,i} = C_{r,i}$, --.

In Column 37, Line 65, in Claim 2, delete "$K_{m,r} = K_{n,r}K_r$," and insert -- $K_{m,r} = K_{n,r} = K_r$, --.

In Column 37, Line 65, in Claim 2, delete "$K_{m,\,r}\}$," and insert -- $K_r\}$, --.

In Column 38, Line 3, in Claim 3, delete "$C_{r,\,Kr}$" and insert -- $C_{r,Kr}$ --.

In Column 38, Line 20, in Claim 5, delete "$G_{m,\,r}$," and insert -- $G_{m,r}$ --.

In Column 38, Line 29, in Claim 6, delete "$G_{m,\,r}=$" and insert -- $G_{m,r}=$ --.

In Column 38, Line 61, in Claim 7, delete "$W_r = W_1 \times W_{2,\,r}$," and insert -- $W_r = W_1 \times W_{2,r}$, --.

In Column 38, Line 65, in Claim 7, delete "1 $^{th}$" and insert -- $1^{th}$ --.

In Column 39, Line 7, in Claim 7, delete "$a_{r,m,tr,m,j}$" and insert -- $a_{r,m,tr,m,i}$ --.

In Column 39, Line 10, in Claim 7, delete "$a_{r,m,tr,m,j}$," and insert -- $a_{r,m,tr,m,i}$, --.

In Column 39, Line 20, in Claim 8, delete "$t_{r,m,j}=$" and insert -- $t_{r,m,i}=$ --.

Signed and Sealed this
Twentieth Day of September, 2022

*Katherine Kelly Vidal*
Katherine Kelly Vidal
*Director of the United States Patent and Trademark Office*

In Column 39, Line 21, in Claim 8, delete "∈" and insert -- i∈ --.

In Column 39, Line 21, in Claim 8, delete "$K_{m,r}$}and" and insert -- $K_r$}, and --.

In Column 39, Lines 51-52, in Claim 11, delete "$W_r=W_1 \times W_{2,\ r}$and" and insert -- $W_r=W_1 \times W_{2,r}$, and --.

In Column 39, Line 54, in Claim 11, delete "$W_{2,\ r}$" and insert -- $W_{2,r}$ --.

In Column 39, Line 56, in Claim 11, delete "$l^{th}$row" and insert -- $l^{th}$ row --.

In Column 39, Line 63, in Claim 11, delete "locations on an" and insert -- locations --.

In Column 39, Line 65, in Claim 11, delete "$a_{r,m,tr,m,j}$" and insert -- $a_{r,m,tr,m,i}$ --.

In Column 40, Line 2, in Claim 11, delete "$a_{r,m,tr,m,j}$," and insert -- $a_{r,m,tr,m,i}$, --.

In Column 40, Line 2, in Claim 11, delete "$K_{m,\ r}$};" and insert -- $K_{m,r}$}; --.

In Column 40, Line 6, in Claim 11, delete "casue" and insert -- cause --.

In Column 40, Line 11, in Claim 12, delete "is" and insert -- is, --.

In Column 40, Line 13, in Claim 12, delete "$t_{r,m,j}=$" and insert -- $t_{r,m,i}=$ --.

In Column 40, Line 13, in Claim 12, delete "$K_{m,\ r}$}," and insert -- $K_r$}, --.

In Column 40, Line 38, in Claim 15, delete "$G_{m,\ r}$" and insert -- $G_{m,r}$ --.

In Column 40, Line 42, in Claim 15, delete "$G_{m,\ r}=$" and insert -- $G_{m,r}=$ --.

In Column 40, Line 53, in Claim 16, delete "$Y_{m,\ n}$," and insert -- $Y_{m,n}$, --.

In Column 41, Line 10, in Claim 17, delete "(PMI) ;" and insert -- (PMI); --.

In Column 41, Line 13, in Claim 17, delete "$W_r=W_1 \times W_{2,\ r}$," and insert -- $W_r=W_1 \times W_{2,r}$, --.

In Column 41, Line 26, in Claim 17, delete "of$V_{2,r}$," and insert -- of $V_{2,r}$, --.

In Column 41, Line 27, in Claim 17, delete "$a_{r,m,tr,m,j}$" and insert -- $a_{r,m,tr,m,i}$ --.

In Column 41, Line 30, in Claim 17, delete "$a_{r,m,tr,m,j}$," and insert -- $a_{r,m,tr,m,i}$, --.

In Column 42, Line 1, in Claim 17, delete "$K_{m,\ r}$" and insert -- $K_{m,r}$ --.

In Column 42, Line 10, in Claim 18, delete "$K_{m,r}$}," and insert -- $K_r$}, --.